United States Patent
Tanaka et al.

(10) Patent No.: US 10,269,101 B2
(45) Date of Patent: Apr. 23, 2019

(54) IMAGING DEVICE, IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventors: Takuya Tanaka, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/783,439

(22) Filed: Oct. 13, 2017

(65) Prior Publication Data

US 2018/0047139 A1    Feb. 15, 2018

Related U.S. Application Data

(63) Continuation of application No. PCT/JP2016/061512, filed on Apr. 8, 2016.

(30) Foreign Application Priority Data

Apr. 16, 2015 (JP) ................... 2015-084393

(51) Int. Cl.
*G06T 5/00* (2006.01)
*G06T 5/20* (2006.01)
(Continued)

(52) U.S. Cl.
CPC .............. *G06T 5/003* (2013.01); *G06T 5/009* (2013.01); *G06T 5/20* (2013.01);
(Continued)

(58) Field of Classification Search
CPC .......... G06T 5/003; G06T 5/009; G06T 5/20; G06T 5/10; G06T 5/40; G08B 13/19617; H04N 7/18
(Continued)

(56) References Cited

U.S. PATENT DOCUMENTS

2009/0195672 A1    8/2009  Ono
2014/0022417 A1    1/2014  Yokoyama et al.
(Continued)

FOREIGN PATENT DOCUMENTS

JP    2009-213129 A    9/2009
JP    2012-5056 A      1/2012
(Continued)

OTHER PUBLICATIONS

International Preliminary Report on Patentability and Written Opinion of the International Searching Authority (forms PCT/IB/373 and PCT/ISA/237), dated Oct. 17, 2017, for corresponding International Application No. PCT/JP2016/061512, with an English translation of the Written Opinion.
(Continued)

*Primary Examiner* — Jonathan S Lee
(74) *Attorney, Agent, or Firm* — Birch, Stewart, Kolasch & Birch, LLP

(57) ABSTRACT

A restoration processing unit performs a restoration process based on an optical transfer function of an optical system for a target image. The entire angle of view of the optical system is greater than 90 degrees. A light amount evaluation region of the optical system is a region in which a distance from the center of an image formation plane is not less than 80% of half of the length of a diagonal line of an imaging surface of an imaging element. When a first evaluation wavelength is used, the ratio of the amount of light in the light amount evaluation region to the amount of light in a region of the optical system corresponding to the center of the image formation plane is not less than 25%. When a second evaluation wavelength is used, the value of the MTF of the optical system acquired at half of the Nyquist frequency of the imaging element is not less than 15%.

19 Claims, 33 Drawing Sheets

| TABLE 1 | | | | | | | | |
|---|---|---|---|---|---|---|---|---|
| WAVELENGTH (nm) | 406.0 | 430.5 | 471.2 | 522.5 | 577.5 | 628.8 | 669.5 | 694.0 |
| WEIGHT | 1 | 3 | 11 | 21 | 26 | 22 | 12 | 4 |

(51) Int. Cl.
*H04N 7/18* (2006.01)
*G08B 13/196* (2006.01)
*G06T 5/10* (2006.01)
*G06T 5/40* (2006.01)

(52) U.S. Cl.
CPC ......... *G08B 13/19617* (2013.01); *H04N 7/18* (2013.01); *G06T 5/10* (2013.01); *G06T 5/40* (2013.01)

(58) Field of Classification Search
USPC ........................................................ 382/255
See application file for complete search history.

(56) References Cited

U.S. PATENT DOCUMENTS

2015/0244934 A1* 8/2015 Duparre ............. H04N 5/23238
348/218.1
2015/0296137 A1* 10/2015 Duparre ............. H04N 5/23238
348/48
2016/0165127 A1 6/2016 Naruse et al.

FOREIGN PATENT DOCUMENTS

| JP | 2013-90066 A | 5/2013 |
| JP | 2014-21312 A | 2/2014 |
| WO | WO 2015/015935 A1 | 2/2015 |

OTHER PUBLICATIONS

International Search Report (form PCT/ISA/210), dated Jun. 28, 2016, for corresponding International Application No. PCT/JP2016/061512, with an English translation.
Japanese Decision to Grant a Patent, dated Oct. 25, 2017, for Japanese Application No. 2017-512512, with an English translation.

* cited by examiner

FIG. 5

| TABLE 1 | | | | | | | | |
|---|---|---|---|---|---|---|---|---|
| WAVELENGTH (nm) | 406.0 | 430.5 | 471.2 | 522.5 | 577.5 | 628.8 | 669.5 | 694.0 |
| WEIGHT | 1 | 3 | 11 | 21 | 26 | 22 | 12 | 4 |

FIG. 13

| TABLE 2 ||||||
|---|---|---|---|---|---|
| SURFACE NUMBER R | CURVATURE RADIUS r | SURFACE INTERVAL d | EFFECTIVE RADIUS er | REFRACTIVE INDEX nd | ABBE NUMBER νd |
| 1 | 17.421 | 1.769 | 9.372 | 1.77250 | 49.60 |
| 2 | 6.924 | 3.038 | 5.768 | | |
| 3 | 43.047 | 0.844 | 5.268 | 1.58913 | 61.13 |
| 4 | 3.944 | 2.547 | 3.377 | | |
| 5 | 6.896 | 1.741 | 2.818 | 1.58313 | 59.37 |
| 6 | 2.442 | 0.950 | 1.900 | | |
| 7 | 8.940 | 3.002 | 1.895 | 1.76182 | 26.52 |
| 8 | −8.940 | 1.891 | 1.643 | 1.58913 | 61.13 |
| 9 | −3.700 | 0.186 | 1.418 | | |
| 10 (STOP) | ∞ | 0.100 | 1.148 | | |
| 11 | 5.498 | 2.121 | 1.228 | 1.58913 | 61.13 |
| 12 | −3.033 | 0.660 | 1.400 | 1.80518 | 25.42 |
| 13 | 5.878 | 0.315 | 1.585 | | |
| 14 | ∞ | 2.000 | 1.647 | 1.71299 | 53.87 |
| 15 | −5.677 | 0.100 | 2.167 | | |
| 16 | 10.985 | 2.500 | 2.413 | 1.77250 | 49.60 |
| 17 | ∞ | 1.500 | 2.600 | | |
| 18 | ∞ | 0.500 | 2.841 | 1.51680 | 64.20 |
| 19 | ∞ | 0.667 | 2.893 | | |

FIG. 14

| TABLE 3 SPECIFICATIONS (d-LINE) ||
|---|---|
| ZOOM MAGNIFICATION | 1.0 |
| f (mm) | 2.00 |
| Bf (mm) | 2.515 |
| FNo. | 2.71 |
| 2ω (°) | 172.2 |
| 2y (mm) | 6.0 |
| TOTAL LENGTH (mm) | 26.3 |
| MAXIMUM DIAMETER φ (mm) | 18.7 |

FIG. 15

| TABLE 4 EVALUATION FREQUENCY: 80 LP/mm ||||
|---|---|---|---|
| HALF ANGLE OF VIEW (°) | MTF (%) || min |
| | TANGENTIAL | SAGITTAL | |
| 0.0 | 80.0 | 80.0 | 80.0 |
| 8.6 | 79.2 | 79.5 | 79.2 |
| 17.2 | 77.9 | 79.0 | 77.9 |
| 25.8 | 75.4 | 78.5 | 75.4 |
| 34.4 | 71.8 | 78.2 | 71.8 |
| 43.0 | 67.2 | 78.1 | 67.2 |
| 51.6 | 62.0 | 78.3 | 62.0 |
| 60.2 | 55.9 | 78.3 | 55.9 |
| 68.9 | 48.6 | 77.7 | 48.6 |
| 77.5 | 40.2 | 76.6 | 40.2 |
| 86.1 | 31.2 | 75.2 | 31.2 |

FIG. 16

| TABLE 5 EVALUATION WAVELENGTH: 546.1nm ||
|---|---|
| HALF ANGLE OF VIEW (°) | RELATIVE ILLUMINATION (%) |
| 0.0 | 100.0 |
| 8.6 | 99.7 |
| 17.2 | 98.8 |
| 25.8 | 97.3 |
| 34.4 | 95.2 |
| 43.0 | 92.6 |
| 51.6 | 89.3 |
| 60.2 | 85.5 |
| 68.9 | 81.2 |
| 77.5 | 76.3 |
| 86.1 | 59.3 |

FIG. 20

TABLE 6

| SURFACE NUMBER R | CURVATURE RADIUS r | SURFACE INTERVAL d | EFFECTIVE RADIUS er | REFRACTIVE INDEX nd | ABBE NUMBER νd |
|---|---|---|---|---|---|
| 1 | 1000.000 | 1.241 | 10.359 | 1.58313 | 59.46 |
| 2 | 13.328 | 2.631 | 8.227 | | |
| 3 | 12.851 | 0.802 | 6.669 | 1.61800 | 63.33 |
| 4 | 6.084 | 3.450 | 4.978 | | |
| 5 | -22.452 | 0.802 | 4.609 | 1.43875 | 94.94 |
| 6 | 6.083 | 1.194 | 3.570 | | |
| 7 | 55.362 | 1.137 | 3.524 | 1.90366 | 31.31 |
| 8 | 5.437 | 4.102 | 3.140 | 1.73800 | 32.26 |
| 9 | -10.339 | 0.288 | 2.747 | | |
| 10 | -6.361 | 1.269 | 2.720 | 1.43875 | 94.94 |
| 11 | -660.738 | 1.487 | 2.691 | | |
| 12 | 24.844 | 3.162 | 2.651 | 1.90366 | 31.31 |
| 13 | 5.151 | 3.581 | 2.429 | 1.64769 | 33.79 |
| 14 | -14.962 | 0.000 | 2.520 | | |
| 15 (STOP) | ∞ | 0.367 | 2.508 | | |
| 16 | 9.404 | 4.941 | 2.721 | 1.43875 | 94.94 |
| 17 | -9.404 | 0.171 | 3.100 | | |
| 18 | 28.877 | 0.811 | 3.169 | 1.88300 | 40.76 |
| 19 | 5.675 | 4.017 | 3.152 | 1.49700 | 81.54 |
| 20 | -16.304 | 0.180 | 3.610 | | |
| 21 | 8.758 | 3.689 | 3.824 | 1.49700 | 81.54 |
| 22 | -10.062 | 0.811 | 3.681 | 1.90366 | 31.31 |
| 23 | -20.678 | 3.000 | 3.719 | | |
| 24 | ∞ | 1.140 | 3.621 | 1.51633 | 64.14 |
| 25 | ∞ | 1.861 | 3.542 | | |

FIG. 21

TABLE 7
SPECIFICATIONS (d-LINE)

| ZOOM MAGNIFICATION | 1.0 |
|---|---|
| f | 2.40 |
| Bf | 5.626 |
| FNo. | 2.04 |
| 2ω (°) | 113.0 |
| 2y | 6.6 |
| TOTAL LENGTH (mm) | 45.8 |
| MAXIMUM DIAMETER φ (mm) | 20.7 |

FIG. 22A

| TABLE 8 SURFACE NUMBER: 1 ||
|---|---|
| KA | -4.5196974E+01 |
| A3 | 0.0000000E+00 |
| A4 | 4.7400288E-03 |
| A5 | -1.4081537E-03 |
| A6 | 1.7195504E-04 |
| A7 | -8.5761990E-06 |
| A8 | -4.4695152E-08 |
| A9 | 1.3075246E-08 |
| A10 | 3.3224865E-10 |
| A11 | 5.2827768E-11 |
| A12 | -1.1292686E-11 |
| A13 | 3.3804326E-13 |
| A14 | 6.0928103E-15 |
| A15 | 3.0462740E-18 |
| A16 | 8.2222957E-19 |
| A17 | 1.2548862E-19 |
| A18 | 1.1522570E-20 |
| A19 | -1.4907651E-22 |
| A20 | -3.7432254E-22 |

FIG. 22B

| TABLE 9 SURFACE NUMBER: 2 ||
|---|---|
| KA | -3.8061934E-01 |
| A3 | 0.0000000E+00 |
| A4 | 5.7738024E-03 |
| A5 | -1.6826135E-03 |
| A6 | 1.7438106E-04 |
| A7 | -6.6888333E-06 |
| A8 | 3.6873974E-08 |
| A9 | -1.0298212E-09 |
| A10 | 5.1736837E-10 |
| A11 | 2.0977521E-11 |
| A12 | -1.3452757E-11 |
| A13 | 4.7614258E-13 |
| A14 | 2.4109259E-14 |
| A15 | -9.0689692E-19 |
| A16 | -3.3286134E-19 |
| A17 | -7.0378569E-20 |
| A18 | -1.4790654E-20 |
| A19 | -2.7969952E-21 |
| A20 | -4.7731322E-22 |

FIG. 23

| TABLE 10 EVALUATION FREQUENCY: 155 LP/mm |||  |
|---|---|---|---|
| HALF ANGLE OF VIEW (°) | MTF (%) || min |
|  | TANGENTIAL | SAGITTAL |  |
| 0.0 | 68.2 | 68.2 | 68.2 |
| 5.7 | 53.8 | 64.1 | 53.8 |
| 11.3 | 44.5 | 61.8 | 44.5 |
| 17.0 | 45.1 | 62.6 | 45.1 |
| 22.6 | 53.1 | 65.2 | 53.1 |
| 28.3 | 59.1 | 64.6 | 59.1 |
| 33.9 | 55.9 | 57.8 | 55.9 |
| 39.6 | 47.5 | 49.6 | 47.5 |
| 45.2 | 40.6 | 46.1 | 40.6 |
| 50.9 | 37.5 | 49.0 | 37.5 |
| 56.5 | 36.3 | 55.1 | 36.3 |

FIG. 24

| TABLE 11 EVALUATION WAVELENGTH: 546.1nm ||
|---|---|
| HALF ANGLE OF VIEW (°) | RELATIVE ILLUMINATION (%) |
| 0.0 | 100.0 |
| 5.7 | 100.0 |
| 11.3 | 99.9 |
| 17.0 | 99.8 |
| 22.6 | 99.6 |
| 28.3 | 99.3 |
| 33.9 | 99.0 |
| 39.6 | 98.5 |
| 45.2 | 95.3 |
| 50.9 | 83.4 |
| 56.5 | 67.1 |

FIG. 28

| TABLE 12 | | | | | |
|---|---|---|---|---|---|
| SURFACE NUMBER R | CURVATURE RADIUS r | SURFACE INTERVAL d | EFFECTIVE RADIUS er | REFRACTIVE INDEX nd | ABBE NUMBER $\nu d$ |
| 1 | 25.333 | 2.890 | 11.008 | 1.51680 | 64.20 |
| 2 | 53.766 | 0.100 | 9.941 | | |
| 3 | 16.669 | 1.000 | 8.015 | 1.71299 | 53.87 |
| 4 | 7.090 | 2.690 | 5.903 | | |
| 5 | 19.083 | 0.820 | 5.625 | 1.71299 | 53.87 |
| 6 | 6.133 | 3.470 | 4.549 | | |
| 7 | -12.373 | 4.100 | 4.403 | 1.48749 | 70.24 |
| 8 | -22.802 | 0.150 | 4.321 | | |
| 9 | 26.765 | 0.820 | 4.210 | 1.48749 | 70.24 |
| 10 | 8.864 | 1.090 | 4.013 | | |
| 11 | 24.237 | 3.110 | 4.033 | 1.83400 | 37.16 |
| 12 | -24.237 | 5.590 | 3.900 | | |
| 13 (STOP) | ∞ | 2.140 | 2.860 | | |
| 14 | -28.295 | 1.960 | 3.403 | 1.74400 | 44.79 |
| 14 | -10.430 | 0.100 | 3.500 | | |
| 16 | 54.570 | 2.730 | 3.645 | 1.48749 | 70.24 |
| 17 | -7.744 | 1.230 | 3.797 | 1.84666 | 23.78 |
| 18 | -19.355 | 0.110 | 4.119 | | |
| 19 | 11.759 | 2.430 | 4.328 | 1.90366 | 31.31 |
| 20 | 7.515 | 3.210 | 4.022 | 1.49700 | 81.54 |
| 21 | -20.819 | 3.370 | 4.069 | | |
| 22 | ∞ | 0.500 | 3.666 | 1.51633 | 64.14 |
| 23 | ∞ | 4.371 | 3.659 | | |

FIG. 29

| TABLE 13 SPECIFICATIONS (d-LINE) | |
|---|---|
| ZOOM MAGNIFICATION | 1.0 |
| f | 4.09 |
| Bf | 8.092 |
| FNo. | 2.06 |
| $2\omega$ (°) | 93.0 |
| 2y | 7.2 |
| TOTAL LENGTH (mm) | 47.8 |
| MAXIMUM DIAMETER $\phi$ (mm) | 22.0 |

FIG. 30

| TABLE 14 EVALUATION FREQUENCY: 112 LP/mm |||  |
|---|---|---|---|
| HALF ANGLE OF VIEW (°) | MTF (%) || min |
|  | TANGENTIAL | SAGITTAL |  |
| 0.0 | 64.6 | 64.6 | 64.6 |
| 4.7 | 62.5 | 64.7 | 62.5 |
| 9.3 | 59.8 | 64.7 | 59.8 |
| 14.0 | 56.0 | 64.9 | 56.0 |
| 18.6 | 51.3 | 65.2 | 51.3 |
| 23.3 | 47.0 | 65.6 | 47.0 |
| 27.9 | 44.1 | 65.9 | 44.1 |
| 32.6 | 42.4 | 65.1 | 42.4 |
| 37.2 | 41.8 | 62.2 | 41.8 |
| 41.9 | 41.8 | 57.1 | 41.8 |
| 46.5 | 42.2 | 51.0 | 42.2 |

FIG. 31

| TABLE 15 EVALUATION WAVELENGTH: 546.1nm ||
|---|---|
| HALF ANGLE OF VIEW (°) | RELATIVE ILLUMINATION (%) |
| 0.0 | 100.0 |
| 4.7 | 100.0 |
| 9.3 | 100.0 |
| 14.0 | 99.9 |
| 18.6 | 99.9 |
| 23.3 | 99.8 |
| 27.9 | 99.7 |
| 32.6 | 99.0 |
| 37.2 | 98.8 |
| 41.9 | 97.3 |
| 46.5 | 86.3 |

FIG. 35

TABLE 16

| SURFACE NUMBER R | CURVATURE RADIUS r | SURFACE INTERVAL d | EFFECTIVE RADIUS er | REFRACTIVE INDEX nd | ABBE NUMBER $\nu d$ |
|---|---|---|---|---|---|
| 1 | 41.864 | 1.200 | 15.145 | 1.58313 | 59.37 |
| 2 | 12.741 | 5.920 | 10.730 | | |
| 3 | 110.071 | 1.100 | 10.292 | 1.62041 | 60.29 |
| 4 | 11.753 | 8.900 | 8.336 | | |
| 5 | -45.110 | 3.200 | 7.291 | 1.59522 | 67.73 |
| 6 | 15.084 | 3.910 | 6.912 | 1.74950 | 35.28 |
| 7 | -38.804 | 0.260 | 6.734 | | |
| 8 | -28.007 | 0.800 | 6.724 | 1.71700 | 47.93 |
| 9 | -258.557 | 14.890 | 6.600 | | |
| 10 (STOP) | ∞ | 8.280 | 4.836 | | |
| 11 | 13.296 | 3.210 | 6.166 | 1.49710 | 81.56 |
| 12 | -65.513 | 0.510 | 6.234 | | |
| 13 | ∞ | 0.700 | 6.176 | 1.48749 | 70.24 |
| 14 | 9.553 | 5.360 | 6.050 | 1.49700 | 81.54 |
| 15 | -15.413 | 0.100 | 6.161 | | |
| 16 | 30.334 | 1.970 | 5.897 | 1.80100 | 34.97 |
| 17 | 7.576 | 4.310 | 5.316 | 1.49700 | 81.54 |
| 18 | -49.227 | 7.500 | 5.304 | | |
| 19 | ∞ | 1.000 | 4.802 | 1.51633 | 64.14 |
| 20 | ∞ | 4.552 | 4.760 | | |

FIG. 36

TABLE 17 SPECIFICATIONS (d-LINE)

| | |
|---|---|
| ZOOM MAGNIFICATION | 1.0 |
| f | 4.16 |
| Bf | 12.696 |
| FNo. | 1.72 |
| 2ω (°) | 126.4 |
| 2y | 8.9 |
| TOTAL LENGTH (mm) | 77.3 |
| MAXIMUM DIAMETER $\phi$ (mm) | 30.3 |

FIG. 37A

| TABLE 18 SURFACE NUMBER: 11 ||
|---|---|
| KA | 4.2719450E-01 |
| A3 | 0.0000000E+00 |
| A4 | -6.7044059E-05 |
| A5 | -4.9133089E-05 |
| A6 | 9.3050441E-06 |
| A7 | -1.1604890E-06 |
| A8 | 1.3435898E-07 |
| A9 | -2.1016328E-08 |
| A10 | 6.8453571E-11 |

FIG. 37B

| TABLE 19 SURFACE NUMBER: 12 ||
|---|---|
| KA | -8.3171805E+00 |
| A3 | 0.0000000E+00 |
| A4 | 1.6689319E-04 |
| A5 | -5.9818843E-05 |
| A6 | 7.8579544E-06 |
| A7 | 4.7505228E-07 |
| A8 | -1.2472304E-07 |
| A9 | -1.9681347E-08 |
| A10 | 1.8261761E-09 |

FIG. 38

| TABLE 20 EVALUATION FREQUENCY: 99 LP/mm ||||
|---|---|---|---|
| HALF ANGLE OF VIEW (°) | MTF (%) || min |
| | TANGENTIAL | SAGITTAL | |
| 0.0 | 79.1 | 79.1 | 79.1 |
| 6.3 | 78.0 | 78.4 | 78.0 |
| 12.6 | 75.5 | 77.4 | 75.5 |
| 19.0 | 70.7 | 75.6 | 70.7 |
| 25.3 | 64.1 | 73.1 | 64.1 |
| 31.6 | 57.9 | 69.9 | 57.9 |
| 37.9 | 53.7 | 66.4 | 53.7 |
| 44.3 | 50.9 | 62.9 | 50.9 |
| 50.6 | 47.7 | 59.9 | 47.7 |
| 56.9 | 43.8 | 57.4 | 43.8 |
| 63.2 | 39.4 | 55.1 | 39.4 |

FIG. 39

| TABLE 21 EVALUATION WAVELENGTH: 546.1nm ||
|---|---|
| HALF ANGLE OF VIEW (°) | RELATIVE ILLUMINATION (%) |
| 0.0 | 100.0 |
| 6.3 | 99.3 |
| 12.6 | 98.7 |
| 19.0 | 96.5 |
| 25.3 | 91.4 |
| 31.6 | 89.3 |
| 37.9 | 82.4 |
| 44.3 | 78.8 |
| 50.6 | 74.5 |
| 56.9 | 69.2 |
| 63.2 | 64.6 |

IMAGING DEVICE, IMAGE PROCESSING DEVICE, IMAGE PROCESSING METHOD, PROGRAM, AND RECORDING MEDIUM

CROSS-REFERENCE TO RELATED APPLICATIONS

The present application is a Continuation of PCT International Application No. PCT/JP2016/061512 filed on Apr. 8, 2016 claiming priority under 35 U.S.C § 119(a) to Japanese Patent Application No. 2015-084393 filed on Apr. 16, 2015. Each of the above applications is hereby expressly incorporated by reference, in their entirety, into the present application.

BACKGROUND OF THE INVENTION

1. Field of the Invention

The present invention relates to an imaging device, an image processing device, an image processing method, a program, and a recording medium, and more particularly, to a technique for restoring a captured wide-angle image.

2. Description of the Related Art

A captured image obtained by an imaging device, such as a digital camera, includes a degradation component such as blurring or distortion caused by, for example, the aberration of an optical system. It is preferable to perform imaging, using an optical system with small aberration, in order to obtain a high-quality image. However, the optical system that can be actually used is limited due to, for example, size and costs. An optical system with a high performance is not necessarily used.

Therefore, a method has been proposed which reduces the influence of a degradation component using image processing after imaging.

JP2013-090066A discloses an imaging device that restores the original image. The imaging device reduces the blurring of an image captured using an optical system with a horizontal angle of view of 180° or more, using a deconvolution process using a blurring reducing filter created according to a point spread function (PSF).

SUMMARY OF THE INVENTION

A surveillance camera used for security or recording requires a function that can capture wide-angle images in order to acquire wide-range images. In particular, importance tends to be attached to the quality of a peripheral portion of a wide-angle image.

The size and cost of an optical system that can be used in an imaging device are limited according to a usage environment or the user's needs. In particular, a surveillance camera used for surveillance requires a small and inexpensive optical system. For example, in the case of the surveillance camera, in general, it is preferable that the total length of at least an optical system part is, for example, equal to or less than about 100 mm and the diameter of the optical system is equal to or less than about 70 mm.

In a case in which a large and expensive optical system is used, it is relatively easy to increase the quality of a peripheral portion of a wide-angle image. However, in practice, an optical system that does not have a high resolution performance is generally used due to the above-mentioned limitations. In particular, a wide-angle lens is likely to reduce the amount of peripheral light. In a case in which a reduction in the amount of peripheral light is prevented under the limit of, for example, size and costs, it is difficult to sufficiently prevent the influence of aberration, which results in a reduction in the resolution of the captured image.

As such, it is difficult to manufacture a small, inexpensive, and high-performance optical system that can capture a wide-angle image. In particular, since a trade-off relationship is established between the amount of peripheral light and aberration, it is very difficult to manufacture a small and inexpensive optical system which is used to capture a wide-angle image and has a high resolution performance while ensuring a sufficient amount of peripheral light.

For this reason, it is considered that a restoration process based on an optical transfer function is performed as image processing to improve the resolution of a captured wide-angle image.

However, the restoration process based on the optical transfer function is not effective in all situations and the effect of the restoration process varies greatly depending on the optical performance of an optical system or the signal-noise ratio (SN ratio) of an imaging system. In some cases, image quality is degraded by the restoration process. For example, a Wiener filter that is generally used in the restoration process operates so as to prevent the degradation of image quality due to the amplification of noise. Therefore, in a case in which the SN ratio of the imaging system is reduced, there is a concern that the resolution of an image will be degraded by the restoration process.

The inventors of the invention conducted a thorough study on an optical system used to capture a wide-angle image and found the technical problem that it was very difficult to determine "the optimum balance of the optical performance of an optical system" for obtaining the effect of improving image resolution using the restoration process based on the optical transfer function, particularly, "the optimum balance between the amount of peripheral light and the resolution performance of the optical system".

In the related art, the technical problem has not drawn attention and an effective technique for "the optimum balance between the amount of peripheral light and the resolution performance of the optical system used to capture a wide-angle image" has not been proposed. For example, JP2013-090066A discloses the restoration process for a captured wide-angle image with a horizontal angle of view of 180° or more, but does not disclose the balance between the amount of peripheral light and the resolution performance of the optical system which is most suitable for the restoration process.

The invention has been made in view of the above-mentioned problems and an object of the invention is to provide a technique for performing a restoration process based on an optical transfer function of an optical system for a wide-angle image captured using an optical system having a good balance between the amount of peripheral light and a resolution performance.

According to an aspect of the invention, there is provided an imaging device comprising: an optical system; an imaging element that receives imaging light through the optical system and outputs a target image; and a restoration processing unit that performs a restoration process based on an optical transfer function of the optical system for the target image. An entire angle of view of the optical system is greater than 90 degrees. A light amount evaluation region of the optical system is a region of the optical system in which a distance from a center of an image formation plane of the optical system in the image formation plane is equal to or greater than 80% of half of a length of a diagonal line of an imaging surface of the imaging element. In a case in which a first evaluation wavelength including a wavelength component of 546.1 nm is used, a ratio of the amount of light in the light amount evaluation region to the amount of light in a region of the optical system corresponding to the center of the image formation plane is equal to or greater than 25%.

In a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging element is equal to or greater than 15%.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

According to another aspect of the invention, there is provided an imaging device comprising: an optical system; an imaging element that receives imaging light through the optical system and outputs a target image; and a restoration processing unit that performs a restoration process based on an optical transfer function of the optical system for the target image. An entire angle of view of the optical system is greater than 90 degrees and the optical system satisfies the following expression.

$$\|H(f, h)\| > \frac{1}{2}\left(1 - \sqrt{1 - \frac{4}{SNR(f)R^2(h)}}\right)$$

In the above-mentioned expression, f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging element and a first evaluation wavelength including a wavelength component of 546.1 nm is used and satisfies 0≤R(h)≤1, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

According to still another aspect of the invention, there is provided an image processing device comprising: an image acquisition unit that acquires a target image; a condition acquisition unit that acquires imaging device conditions indicating information of an optical system and an imaging element when the target image is captured; and a restoration processing unit that performs a restoration process based on an optical transfer function of the optical system for the target image in a case in which the imaging device conditions satisfy the following conditions (1), (2), and (3):

(1) an entire angle of view of the optical system is greater than 90 degrees;

(2) in a case in which a light amount evaluation region of the optical system is a region of the optical system in which a distance from a center of an image formation plane of the optical system in the image formation plane is equal to or greater than 80% of half of a length of a diagonal line of an imaging surface of the imaging element and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and (3) in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging element is equal to or greater than 15%.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

Preferably, the value of the MTF in the condition (3) is the smaller of the value of the MTF of the optical system in a sagittal direction and the value of the MTF in a tangential direction.

According to this aspect, it is possible to simply determine whether the condition (3) is satisfied.

Preferably, the restoration processing unit performs the restoration process in a case in which the imaging device conditions further satisfy the following conditions (4) and (5):

(4) in a case in which the first evaluation wavelength is used, the ratio of the amount of light in the light amount evaluation region to the amount of light in the region of the optical system corresponding to the center of the image formation plane is equal to or greater than 30%; and (5) in a case in which the second evaluation wavelength is used, the value of the MTF acquired at half of the Nyquist frequency of the imaging element is equal to or greater than 20%.

According to this aspect, image resolution can be effectively improved by the restoration process.

Preferably, the restoration processing unit performs the restoration process in a case in which the imaging device conditions further satisfy the following conditions (6) and (7): (6) in a case in which the first evaluation wavelength is used, the ratio of the amount of light in the light amount evaluation region to the amount of light in the region of the optical system corresponding to the center of the image formation plane is equal to or greater than 35%; and (7) in a case in which the second evaluation wavelength is used, the value of the MTF acquired at half of the Nyquist frequency of the imaging element is equal to or greater than 25%.

According to this aspect, image resolution can be effectively improved by the restoration process.

According to yet another aspect of the invention, there is provided an image processing device comprising: an image acquisition unit that acquires a target image; a condition acquisition unit that acquires imaging device conditions indicating information of an optical system and an imaging element when the target image is captured; and a restoration processing unit that performs a restoration process based on an optical transfer function of the optical system for the target image in a case in which the imaging device conditions satisfy the following condition (8) and an expression represented by the following condition (9).

(8) An entire angle of view of the optical system is greater than 90 degrees.

$$\|H(f, h)\| > \frac{1}{2}\left(1 - \sqrt{1 - \frac{4}{SNR(f)R^2(h)}}\right) \quad (9)$$

In the above-mentioned expression, f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging element and a first evaluation wavelength including a wavelength component of 546.1 nm is used and satisfies 0≤R(h)≤1, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

Preferably, the restoration processing unit performs the restoration process in a case in which the imaging device conditions further satisfy an expression represented by the following condition (10):

$$A\ \%\geq 0.75\times B\ \%-40\% \quad (10)$$

where A % indicates the value of the MTF of the optical system acquired at half of the Nyquist frequency of the imaging element in a case in which the second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, and B % indicates a ratio of the amount of light in the light amount evaluation region to the amount of light in the region of the optical system corresponding to the center of the image formation plane in a case in which the first evaluation wavelength including a wavelength component of 546.1 nm is used.

According to this aspect, it is possible to effectively prevent discomfort in a sense of resolution caused by a significant improvement in the value of the MTF of an image by the restoration process.

Preferably, the light amount evaluation region is a region of the optical system in which the distance from the center of the image formation plane in the image formation plane is equal to or greater than 60% of half of the length of the diagonal line of the imaging surface of the imaging element.

According to this aspect, the quality of the target image can be more effectively improved by the restoration process.

According to still yet another aspect of the invention, there is provided an imaging device comprising: an optical system mounting unit to which an optical system is detachably attached; an imaging element that receives imaging light through the optical system mounted on the optical system mounting unit and outputs an image; and the image processing device. The image output from the imaging element is the target image.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

According to yet still another aspect of the invention, there is provided an imaging device comprising: a camera device including an optical system, an imaging element that receives imaging light through the optical system and outputs an image, a camera-side control processing unit that is connected to the imaging element, and a camera-side communication unit that is connected to the camera-side control processing unit; and a control terminal including a terminal-side communication unit that can communicate with the camera-side communication unit, a terminal-side control processing unit that is connected to the terminal-side communication unit, and a user interface that is connected to the terminal-side control processing unit. At least one of the camera-side control processing unit or the terminal-side control processing unit includes the image processing device and the image output from the imaging element is the target image.

According to this aspect, the restoration process based on the optical transfer function of the optical system is performed for a wide-angle image captured using the optical system having a good balance between the amount of peripheral light and the resolution performance. Therefore, the quality of the target image can be improved by the restoration process.

According to still yet another aspect of the invention, there is provided an image processing method comprising: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following conditions (1), (2), and (3): (1) an entire angle of view of the optical system is greater than 90 degrees; (2) in a case in which a light amount evaluation region of the optical system is a region of the optical system in which a distance from a center of an image formation plane of the optical system in the image formation plane is equal to or greater than 80% of half of a length of a diagonal line of an imaging surface of the imaging element and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and (3) in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging element is equal to or greater than 15%.

According to yet still another aspect of the invention, there is provided an image processing method comprising: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following condition (8) and an expression represented by the following condition (9).

(8) An entire angle of view of the optical system is greater than 90 degrees.

$$\|H(f, h)\| > \frac{1}{2}\left(1 - \sqrt{1 - \frac{4}{SNR(f)R^2(h)}}\right) \quad (9)$$

In the above-mentioned expression, f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging element and a first evaluation wavelength including a wavelength component of 546.1 nm is used and satisfies 0≤R(h)≤1, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

According to still yet another aspect of the invention, there is provided a program that causes a computer to perform: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following conditions (1), (2), and (3):

(1) an entire angle of view of the optical system is greater than 90 degrees;

(2) in a case in which a light amount evaluation region of the optical system is a region of the optical system in which a distance from a center of an image formation plane of the optical system in the image formation plane is equal to or greater than 80% of half of a length of a diagonal line of an imaging surface of the imaging element and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and (3) in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging element is equal to or greater than 15%.

According to yet still another aspect of the invention, there is provided a program that causes a computer to perform: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following condition (8) and an expression represented by the following condition (9).

(8) An entire angle of view of the optical system is greater than 90 degrees.

$$\|H(f, h)\| > \frac{1}{2}\left(1 - \sqrt{1 - \frac{4}{SNR(f)R^2(h)}}\right) \quad (9)$$

In the above-mentioned expression, f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging element and a first evaluation wavelength including a wavelength component of 546.1 nm is used and satisfies 0≤R(h)≤1, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

According to still yet another aspect of the invention, there is provided a non-transitory computer-readable tangible recording medium that stores a program causing a computer to perform: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following conditions (1), (2), and (3):

(1) an entire angle of view of the optical system is greater than 90 degrees;

(2) in a case in which a light amount evaluation region of the optical system is a region of the optical system in which a distance from a center of an image formation plane of the optical system in the image formation plane is equal to or greater than 80% of half of a length of a diagonal line of an imaging surface of the imaging element and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and (3) in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging element is equal to or greater than 15%.

According to yet still another aspect of the invention, there is provided a non-transitory computer-readable tangible recording medium that stores a program causing a computer to perform: a step of acquiring a target image; a step of acquiring imaging device conditions indicating information of an optical system and an imaging element when the target image is captured; and a step of performing a restoration process based on an optical transfer function of the optical system for the target image in a case in which the imaging device conditions satisfy the following condition (8) and an expression represented by the following condition (9).

(8) An entire angle of view of the optical system is greater than 90 degrees.

$$\|H(f, h)\| > \frac{1}{2}\left(1 - \sqrt{1 - \frac{4}{SNR(f)R^2(h)}}\right) \quad (9)$$

In the above-mentioned expression, f indicates a spatial frequency of the target image, h indicates a distance from a center of the target image, $H(f, h)$ indicates an OTF of the optical system, $R(h)$ indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging element and a first evaluation wavelength including a wavelength component of 546.1 nm is used and satisfies $0 \leq R(h) \leq 1$, $SNR(f)$ is represented by $SNR(f)=S(f)/N(f)$, $S(f)$ indicates a mean square value of the amount of signal at the center of the target image expected in an assumed imaging condition, and $N(f)$ indicates a mean square value of the amount of noise expected in an assumed imaging condition.

According to the invention, the restoration process based on the optical transfer function of the optical system is performed for a wide-angle image captured using the optical system having a good balance between the amount of peripheral light and the resolution performance. Therefore, the quality of the target image can be improved by the restoration process.

BRIEF DESCRIPTION OF THE DRAWINGS

FIG. 5 is a diagram (Table 1) illustrating an example of wavelengths forming a second evaluation wavelength.

FIG. 13 is a table (Table 2) illustrating the basic data of the optical system according to Example 1.

FIG. 14 is a table (Table 3) illustrating the specifications of the optical system according to Example 1.

FIG. 15 is a table (Table 4) illustrating the value of an MTF of the optical system according to Example 1.

FIG. 16 is a table (Table 5) illustrating the relative illumination of the optical system according to Example 1.

FIG. 20 is a table (Table 6) illustrating the basic data of the optical system according to Example 2.

FIG. 21 is a table (Table 7) illustrating the specifications of the optical system according to Example 2.

FIGS. 22A and 22B are tables illustrating conic constants "KA" and aspheric coefficients "A3 to A20" of aspheric surfaces of the optical system according to Example 2, FIG. 22A (Table 8) illustrates data of "a surface with surface number 1" and FIG. 22B (Table 9) illustrates data of "a surface with surface number 2".

FIG. 23 is a table (Table 10) illustrating the value of an MTF of the optical system according to Example 2.

FIG. 24 is a table (Table 11) illustrating the relative illumination of the optical system according to Example 2.

FIG. 28 is a table (Table 12) illustrating the basic data of the optical system according to Example 3.

FIG. 29 is a table (Table 13) illustrating the specifications of the optical system according to Example 3.

FIG. 30 is a table (Table 14) illustrating the value of an MTF of the optical system according to Example 3.

FIG. 31 is a table (Table 15) illustrating the relative illumination of the optical system according to Example 3.

FIG. 35 is a table (Table 16) illustrating the basic data of the optical system according to Example 4.

FIG. 36 is a table (Table 17) illustrating the specifications of the optical system according to Example 4.

FIGS. 37A and 37B are tables illustrating conic constants "KA" and aspheric coefficients "A3 to A10" of aspheric surfaces of the optical system according to Example 4, FIG. 37A (Table 18) illustrates data of "a surface with surface number 1", and FIG. 37B (Table 19) illustrates data of "a surface with surface number 2".

FIG. 38 is a table (Table 20) illustrating the value of an MTF of the optical system according to Example 4.

FIG. 39 is a table (Table 21) illustrating the relative illumination of the optical system according to Example 4.

DESCRIPTION OF THE PREFERRED EMBODIMENTS

Hereinafter, embodiments of the invention will be described with reference to the drawings. In the following embodiments, an example in which the invention is applied to a surveillance camera system will be described. However, the object to which the invention is applied is not limited thereto and the invention can be applied to an imaging device, an image processing device, an image processing method, a program, and a recording medium other than the surveillance camera system.

An optical system used in the following embodiments is designed on the premise that it is used to capture a wide-angle image and a restoration process based on an optical transfer function is used. The optimum balance conditions of the optical performance (particularly, the amount of peripheral light and a resolution performance) of the optical system are clear. The restoration process based on the optical transfer function is applied to an image captured using the optical system satisfying the optimum balance conditions. Therefore, an image with high quality is provided to a user.

The resolution performance of the optical system can be represented by an optical transfer function such as a modulation transfer function (MTF). Even in a case in which the MTF of the optical system is low, the restoration process based on the optical transfer function can be applied to a captured image to acquire a high-resolution image.

Therefore, the relationship to be satisfied between the amount of peripheral light and the resolution performance of the optical system is defined in order to prescribe the peripheral resolution of the image subjected to the restoration process and the optimum optical system (lens) can be designed on the basis of the relationship. That is, the optical system is designed such that the resolution performance (MTF performance) obtained on the basis of the image subjected to the restoration process on the premise that the restoration process based on the optical transfer function is performed satisfies the optical performance specifications (for example, aberration and the amount of light) required by the user. As such, an image processing technique and an optical system design technique are appropriately combined with each other to design an optical system such that the optical performance specifications which are difficult to optimize since they have a trade-off relationship therebetween are optimized and the total performance is maximized.

Next, a specific embodiment will be described.

Figure 1:
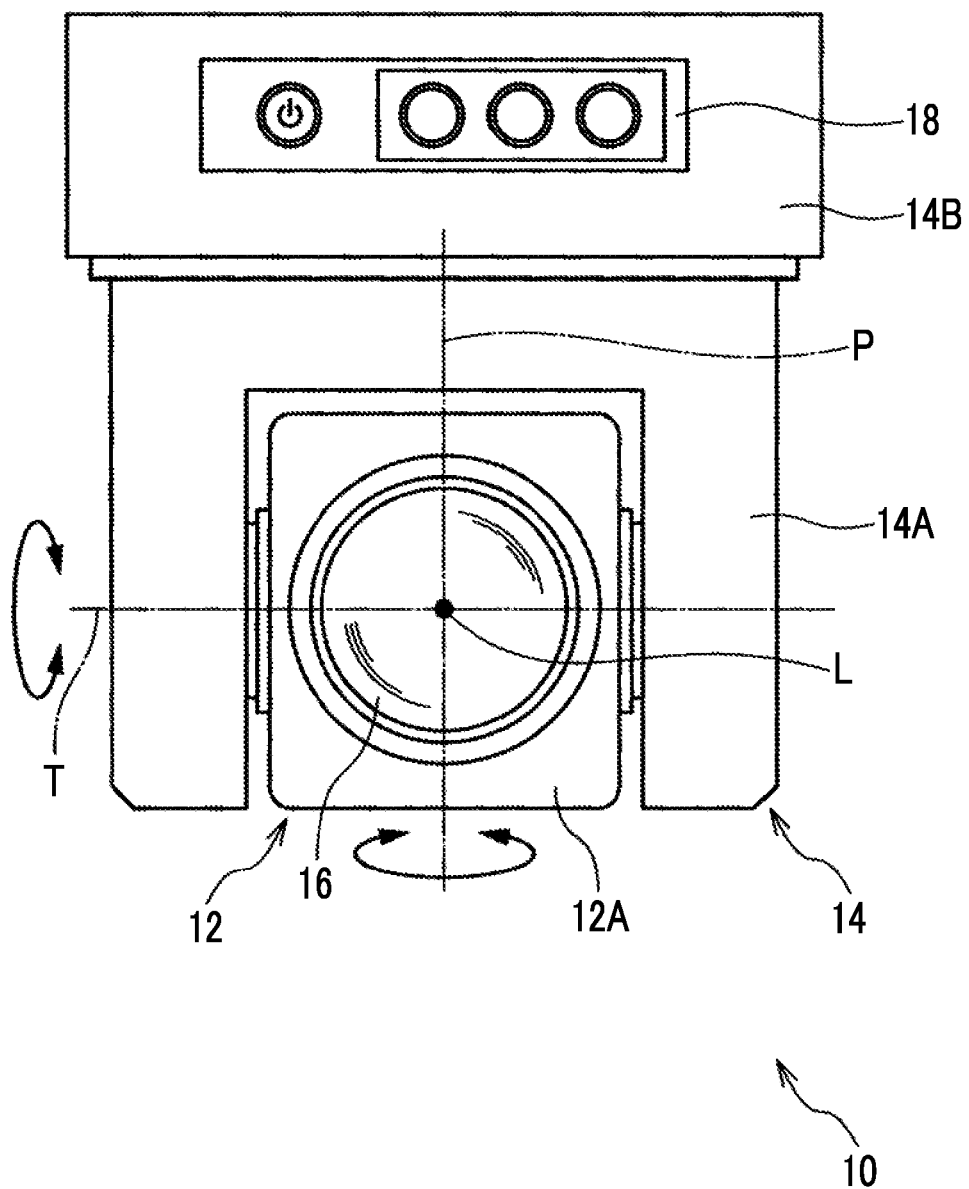
FIG. 1 is a diagram illustrating the outward appearance of an example of a camera device used in a surveillance camera system.

FIG. 1 is a diagram illustrating the outward appearance of an example of a camera device 10 used in a surveillance camera system.

In this example, the camera device 10 has a pan function and a tilt function and can capture images under the control of a control terminal (see FIG. 2) which will be described below. That is, the camera device 10 includes an imaging unit 12 that captures an image of an object and a support unit 14 that supports the imaging unit 12 such that it can be panned and tilted.

The imaging unit 12 includes an optical system 16 that is supported by an imaging support unit 12A. The optical system 16 is driven by a lens driving unit (not illustrated) such that the focus, zoom, and stop aperture thereof are adjusted.

The support unit 14 includes a support frame 14A and a mount 14B and the mount 14B supports the support frame 14A such that the support frame 14A can be rotated on a pan axis P. A control panel 18 is provided in the mount 14B. The user can operate various operation buttons, such as a power button, included in the control panel 18 to control the camera device 10. The support frame 14A has a groove-shaped space in which the imaging unit 12 is provided and supports the imaging unit 12 such that the imaging unit 12 can be rotated on a tilt axis T perpendicular to the pan axis P. A tilt driving unit (not illustrated) that rotates the imaging unit 12 on the tilt axis T is provided in the support frame 14A and a pan driving unit (not illustrated) that rotates the support frame 14A on the pan axis P is provided in the mount 14B. The optical axis L of the optical system 16 that is supported so as to be panned and tilted as described above is perpendicular to the pan axis P and the tilt axis T.

FIG. 1 illustrates the camera device 10 that can be panned and tilted. However, the camera device 10 does not necessarily have a pan/tilt mechanism and the imaging unit 12 may be fixed to the support unit 14.

Figure 2:
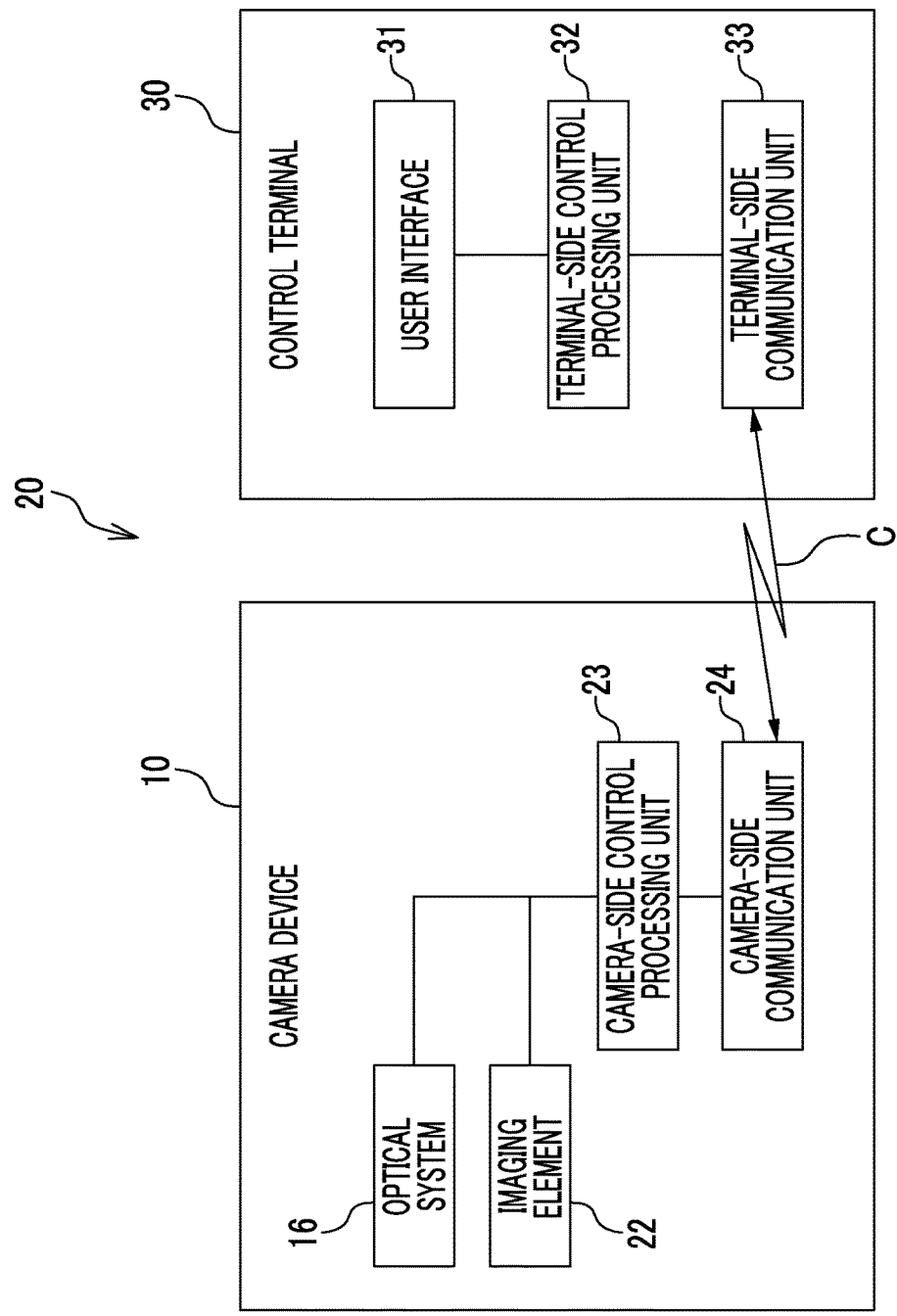
FIG. 2 is a block diagram illustrating an example of the functional configuration of an imaging device and particularly illustrates an example of the functional configuration suitable for a surveillance camera system.

FIG. 2 is a block diagram illustrating an example of the functional configuration of an imaging device and particularly illustrates an example of the preferred functional configuration of a surveillance camera system 20. For convenience of explanation, FIG. 2 illustrates only the main functional configuration of imaging and communication. For example, the pan driving unit or the tilt driving unit is not illustrated in FIG. 2.

In this example, the surveillance camera system 20 includes the camera device 10 and a control terminal 30 that can control the camera device 10.

The camera device 10 includes the optical system 16, an imaging element 22 that receives imaging light through the optical system 16 and outputs an image (target image), a camera-side control processing unit 23 connected to the optical system 16 and the imaging element 22, and a camera-side communication unit 24 connected to the camera-side control processing unit 23. The control terminal 30 includes a terminal-side communication unit 33 that can perform communication (see letter "C" in FIG. 2) with the camera-side communication unit 24, a terminal-side control processing unit 32 connected to the terminal-side communication unit 33, and a user interface 31 connected to the terminal-side control processing unit 32.

The optical system 16 includes a plurality of lenses and a stop and guides imaging light from an object to the imaging element 22. The imaging element 22 is an image sensor such as a charge coupled device (CCD) or a complementary metal oxide semiconductor (CMOS) sensor. The user interface 31 of the control terminal 30 includes a display unit that can present various kinds of information to the user, in addition to an operation unit such as buttons or a touch panel that can be directly operated by the user.

The camera-side control processing unit 23 controls the optical system 16, the imaging element 22, and the camera-side communication unit 24 and performs image processing for, for example, an image output from the imaging element 22 as the target image. The terminal-side control processing unit 32 controls the user interface 31 and the terminal-side communication unit 33, receives, for example, data or a command input by the user through the user interface 31, and reflects the data or the command in various processes. In addition, the terminal-side control processing unit 32 receives data or a command transmitted from the camera device 10 (camera-side communication unit 24) through the terminal-side communication unit 33 and reflects the data or the command in various processes.

The camera-side control processing unit 23 and the terminal-side control processing unit 32 can transmit and receive, for example, image data or other data through the communication C between the camera-side communication unit 24 and the terminal-side communication unit 33. Therefore, the user can input various kinds of data and various commands to the terminal-side control processing unit 32 through the user interface 31 of the control terminal 30 to control the camera device 10. That is, data or a command for controlling the camera-side control processing unit 23 is transmitted from the terminal-side control processing unit 32 to the camera-side control processing unit 23 through the terminal-side communication unit 33 and the camera-side communication unit 24 to control the optical system 16 and the imaging element 22 through the camera-side control processing unit 23.

In addition, the image output from the imaging element 22 may be processed by the camera-side control processing unit 23, the terminal-side control processing unit 32, or both the camera-side control processing unit 23 and the terminal-side control processing unit 32. That is, the image output from the imaging element 22 may be processed by the camera-side control processing unit 23 and then transmitted to the terminal-side control processing unit 32 through the camera-side communication unit 24 and the terminal-side communication unit 33. Alternatively, the image may be processed by the terminal-side control processing unit 32.

Therefore, in the surveillance camera system 20 according to this example, an image processing device which will be described below may be provided in at least one of the camera-side control processing unit 23 or the terminal-side control processing unit 32.

Figure 3:
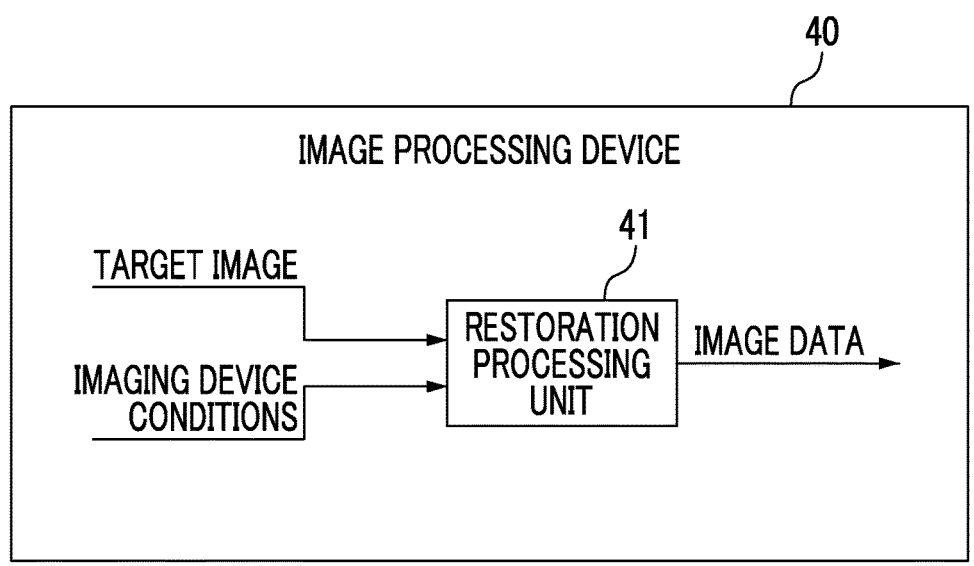
FIG. 3 is a block diagram illustrating an example of the functional configuration of an image processing device.

FIG. 3 is a block diagram illustrating an example of the functional configuration of an image processing device 40. In this example, the image processing device 40 includes a restoration processing unit 41. A target image and data for imaging device conditions are input to the restoration processing unit 41.

The target image is an image output from the imaging element 22 and is directly or indirectly input from the imaging element 22 to the restoration processing unit 41 (image processing device 40). The imaging device conditions indicate the information of the optical system 16 and the imaging element 22 when the target image is captured. Then, the restoration processing unit 41 performs the restoration process for the target image on the basis of the optical transfer function of the optical system, using the target image and the imaging device conditions.

The method of acquiring the target image and the data for the imaging device conditions in the restoration processing unit 41 is not particularly limited. The target image and the data for the imaging device conditions can be input from each unit forming the surveillance camera system 20 to the restoration processing unit 41. For example, in a case in which the image processing device 40 is provided in the camera-side control processing unit 23 of the camera device 10, the image processing device 40 may acquire an image output from the imaging element 22 as the target image and acquire the imaging device conditions from the data used by the camera-side control processing unit 23 to control the optical system 16 and the imaging element 22. In contrast, in a case in which the image processing device 40 is provided in the terminal-side control processing unit 32 of the control terminal 30, the image processing device 40 may acquire the target image from the imaging element 22 through the camera-side control processing unit 23, the camera-side communication unit 24, and the terminal-side communication unit 33 and acquire the imaging device conditions from "the data used to control the optical system 16 and the imaging element 22" which is held by the camera-side control processing unit 23 or the terminal-side control processing unit 32.

In a case in which meta data is added to target image data according to a format, such as an exchangeable image file format (Exif), the image processing device 40 may read the meta data added to the target image data and acquire the imaging device conditions.

In a case in which the surveillance camera system 20 (the camera-side control processing unit 23 and/or the terminal-side control processing unit 32) includes the image processing device 40 illustrated in FIG. 3, the optical system 16 satisfies, for example, all of the following first to third processing conditions (condition (1) (condition (8)), condition (2), and condition (3)) (first embodiment).

<First Processing Condition>

The entire angle of view of the optical system 16 is greater than 90 degrees.

<Second Processing Condition>

A light amount evaluation region of the optical system 16 is a region of the optical system 16 in which the distance from the center of an image formation plane of the optical system 16 in the image formation plane is equal to or greater than 80% of half of the length of a diagonal line of an imaging surface of the imaging element 22. In a case in which a first evaluation wavelength including a wavelength component of 546.1 nm is used, the ratio of the amount of light in the light amount evaluation region to the amount of light in a region of the optical system 16 corresponding to the center of the image formation plane is equal to or greater than 25%.

<Third Processing Condition>

In a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, the value of the MTF of the optical system 16 acquired at half of the Nyquist frequency of the imaging element 22 is equal to or greater than 15%.

The restoration process performed by the restoration processing unit 41 is applied to the target image captured using the optical system 16 satisfying the first to third processing conditions. In a case in which the restoration process based on the optical transfer function is performed for the target image captured using the optical system 16 satisfying the first to third processing conditions, the resolution performance of the target image is improved by 10% or more by the restoration process, which will be described below.

As another example, the optical system 16 satisfies both the first processing condition and the following fourth processing condition (second embodiment). In this case, the restoration process performed by the restoration processing unit 41 is applied to the target image captured using the optical system 16 satisfying the first processing condition (condition (8)) and the following fourth processing condition (condition (9)).

<Fourth Processing Condition>

$$\|H(f, h)\| > \frac{1}{2}\left(1 - \sqrt{1 - \frac{4}{SNR(f)R^2(h)}}\right)$$

In the above-mentioned expression, "f" indicates a spatial frequency of the target image, "h" indicates a distance from the center of the target image, "H(f, h)" indicates the optical transfer function (OTF) of the optical system 16, "R(h)" indicates the ratio of the amount of light in the light amount evaluation region of the optical system 16 to the amount of light in a region of the optical system 16 corresponding to the center of the image formation plane of the optical system 16 in a case in which the light amount evaluation region is a region of the optical system 16 in which the distance from the center of the image formation plane in the image formation plane is equal to or greater than 80% of half of the length of the diagonal line of the imaging surface of the imaging element 22 and the first evaluation wavelength including a wavelength component of 546.1 nm is used and satisfies "0≤R(h)≤1", "SNR(f)" is represented by "SNR(f)= S(f)/N(f)", "S(f)" indicates the mean square value of the amount of signal at the center of the target image expected in an assumed imaging condition, and "N(f)" indicates the mean square value of the amount of noise expected in an assumed imaging condition.

The first processing condition means that the target image to which the restoration process based on the optical transfer function is applied is a wide-angle image. For example, in a case in which the surveillance camera system is assumed for indoor surveillance, a minimum angle of view of 90 degrees is needed in order to surveil the entire room from the corner of the room without making a blind spot. Therefore, for example, in a case in which the surveillance camera system is assumed for surveillance, it is preferable that the entire angle of view of the optical system 16 is greater than 90 degrees.

Even in a case in which the imaging device is installed at the corner of the room, the apex of the optical system 16 is disposed at a position that is slightly closer to the inside of the room than the corner of the room, considering the size of the imaging device. Therefore, it is preferable that the entire angle of view of the optical system 16 is an angle of view (for example, about 100 degrees) that is greater than 90 degrees. In addition, it is preferable that the entire angle of view of the optical system 16 is greater than 100 degrees in order to improve flexibility in the arrangement of the imaging device. Therefore, the entire angle of view of the optical system 16 is preferably greater than 100 degrees, more preferably greater than 110 degrees, and most preferably greater than 120 degrees.

The second processing condition indicates that "relative illumination" acquired using the "first evaluation wavelength" for the "light amount evaluation region" of the optical system 16 is "equal to or greater than 25%".

The term "relative illumination" is the ratio of "the amount of light in the light amount evaluation region" to "the amount of light in the region of the optical system 16 corresponding to the center of the image formation plane" and indicates the difference between the amount of light in a central portion and the amount of light in a peripheral portion of the optical system 16.

The "light amount evaluation region" is a reference region for acquiring the relative illumination and is determined on the basis of the imaging surface of the imaging element 22 in the second processing condition.

Figure 4:
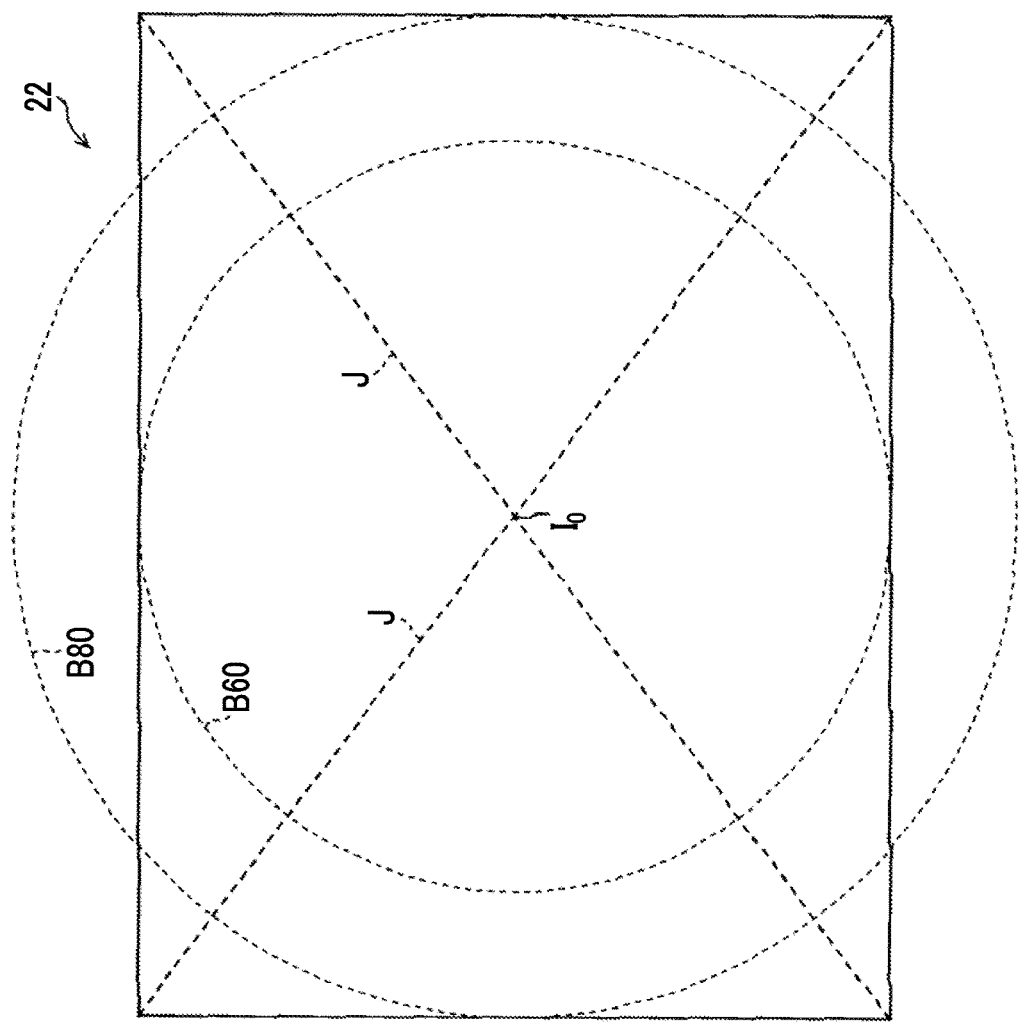
FIG. 4 is a plan view illustrating an imaging surface of an imaging element and is a diagram illustrating the range of the imaging surface used to determine a light amount evaluation region of an optical system.

FIG. 4 is a plan view illustrating the imaging surface of the imaging element 22 and is a diagram illustrating the range of the imaging surface used to determine the light amount evaluation region of the optical system 16. In the imaging surface of the rectangular imaging element 22, half of the length of a diagonal line J corresponds to the distance from an imaging surface center Io indicated by an intersection point between the diagonal lines J to the vertex of the imaging surface. In FIG. 4, the position where the distance from the imaging surface center Io corresponds to "80% of half of the length of the diagonal line J" is represented by "B80 (80% image height line)".

In this example, the region of the optical system 16 in which the distance from the center of the image formation plane in the image formation plane is "equal to or greater than 80% of half of the length of the diagonal line J of the imaging surface of the imaging element 22" is set as the "light amount evaluation region". In addition, the "light amount evaluation region" is not limited to this region of the optical system 16 and may be a wider region. For example, the light amount evaluation region may be a region of the optical system 16 in which the distance from the center of the image formation plane in the image formation plane is "equal to or greater than 60%" of half of the length of the diagonal line J of the imaging surface of the imaging element 22 (see "B60 (60% image height line)" indicating the position where the distance from the imaging surface center Io corresponds to "60% of half of the length of the diagonal line J" in FIG. 4).

In the second processing condition, the relative illumination of the light amount evaluation region needs to be "equal to or greater than 25%". However, the relative illumination of the light amount evaluation region may be more strictly limited. For example, the condition of the optical system 16 may be that the relative illumination of the light amount evaluation region is "equal to or greater than 30%" or the condition of the optical system 16 may be that the relative illumination of the light amount evaluation region is "equal to or greater than 35%".

The third processing condition indicates the value of the MTF to be satisfied by the optical system 16. A second evaluation wavelength used to evaluate the MTF of the optical system 16 in the third processing condition includes each wavelength component satisfying the following weight ratio (see FIG. 5 (Table 1)): the weight ratio of "a wavelength component of 406.0 nm: a wavelength component of 430.5 nm: a wavelength component of 471.2 nm: a wavelength component of 522.5 nm: a wavelength component of 577.5 nm: a wavelength component of 628.8 nm: a wavelength component of 669.5 nm: a wavelength component of 694.0 nm=1:3:11:21:26:22:12:4". In a case in which the second evaluation wavelength is used, the value of the MTF of the optical system 16 at half of the Nyquist frequency which is defined by a pixel pitch of the imaging element 22 is equal to or greater than 15%.

In the third processing condition, the value of the MTF of the optical system 16 needs to be "equal to or greater than 15%". However, the value of the MTF may be more strictly limited. For example, the condition of the optical system 16 may be that the value of the MTF is "equal to or greater than 20%" or the condition of the optical system 16 may be that the value of the MTF is "equal to or greater than 25%".

The directionality of the value of the MTF in the third processing condition is not particularly limited. For example, the smaller of the value of the MTF of the optical system 16 in a sagittal direction and the value of the MTF of the optical system 16 in a tangential direction may satisfy the condition (for example, "equal to or greater than 15%") defined in the third processing condition. The sagittal direction corresponds to a circumferential direction of the optical system 16 and the tangential direction corresponds to a diametrical direction of the optical system 16.

The third processing condition may be satisfied in the entire region of the optical system 16 or may be satisfied in a portion of the optical system 16. It is preferable that the restoration process performed by the restoration processing unit 41 is applied to an image area corresponding to the region of the optical system 16 satisfying at least the third processing condition. Alternatively, in a case in which a zoom position or the stop is changed and the third processing condition is not satisfied in at least a portion of the optical system 16, the restoration process performed by the restoration processing unit 41 may not be performed.

Figure 6:
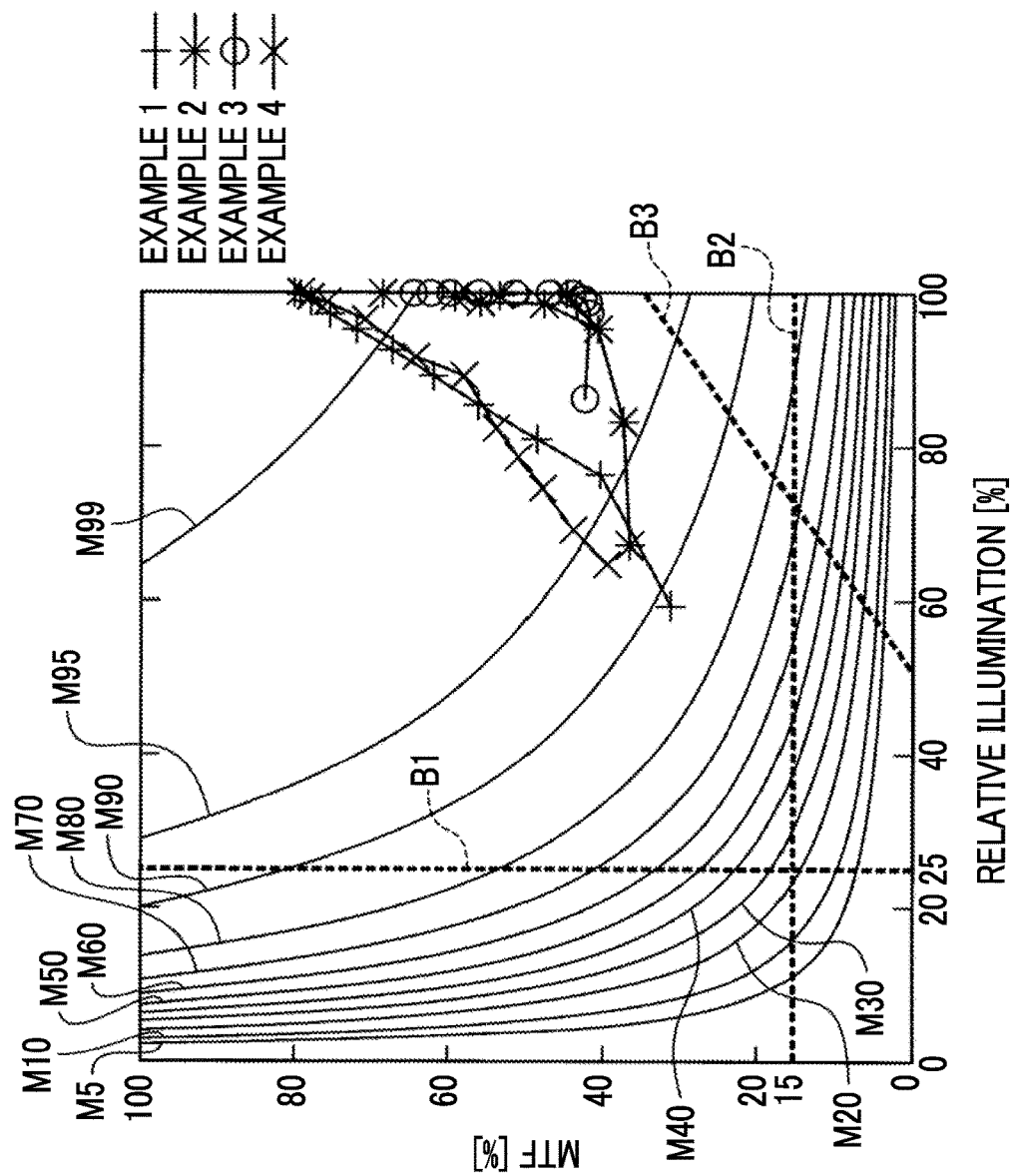
FIG. 6 is a diagram illustrating an example of the optical performance of an optical system according to a first embodiment.

FIG. 6 is a diagram illustrating an example of the optical performance of the optical system 16 according to the first embodiment. In FIG. 6, the horizontal axis indicates "relative illumination (%)" and the vertical axis indicates "the value of the MTF (%)". In addition, the SN ratio is assumed to be "24 decibels (dB)". In addition, in FIG. 6, lines represented by reference numerals "M5", "M10", "M20", "M30", "M40", "M50", "M60", "M70", "M80", "M90", "M95", and "M99" indicate the values of the MTF which can be restored by the restoration process based on the optical transfer function and indicate regions in which the values of the MTF can be restored to "5%", "10%", "20%", "30%", "40%", "50%", "60%", "70%", "80%", "90%", "95%", and "99%" by the restoration process, respectively.

For example, in an image captured using the optical system 16 in which the "relative illumination (%)" and "the value of the MTF (%)" are present in a region (a right corner in FIG. 6) surrounded by the line "M99", the value of the MTF can be restored to at least 99% by the restoration process based on the optical transfer function. Similarly, in an image captured using the optical system 16 in which the "relative illumination (%)" and "the value of the MTF (%)" are present in a region surrounded by the line "M99" and the line "M95", the value of the MTF can be restored to at least 95% by the restoration process based on the optical transfer function.

For example, a region in which the relative illumination (the ratio of the amount of light in the light amount evaluation region to the amount of light in the region of the optical system 16 corresponding to the center of the image formation plane) is "equal to or greater than 25%" which is defined in the second processing condition means a region (including a line B1) on the right side of the line B1 in FIG. 6. In addition, a region in which the value of the MTF of the optical system 16 is "equal to or greater than 15%" which is defined in the third processing condition means a region (including a line B2) on the upper side of the line B2 in FIG. 6.

Therefore, the optical system 16 satisfying the second processing condition and the third processing condition is included in the upper right region surrounded by the line B1 and the line B2 in FIG. 6.

The optical system 16 may satisfy the conditions that are stricter than the second processing condition and the third processing condition. In order to increase a restoration ratio, for example, the optical system 16 preferably satisfies the following "fifth and sixth processing conditions (condition (4) and condition (5))" and more preferably satisfies the following "seventh and eighth processing conditions (condition (6) and condition (7))". In this case, for example, the restoration process performed by the restoration processing unit 41 is applied to the target image captured using the optical system 16 satisfying the following "fifth and sixth processing conditions" or the following "seventh and eighth processing conditions".

<Fifth Processing Condition>

In a case in which the first evaluation wavelength is used, the ratio of the amount of light in the light amount evaluation region to the amount of light in the region of the optical system 16 corresponding to the center of the image formation plane is equal to or greater than 30%.

<Sixth Processing Condition>

In a case in which the second evaluation wavelength is used, the value of the MTF of the optical system 16 acquired at half of the Nyquist frequency of the imaging element 22 is equal to or greater than 20%.

<Seventh Processing Condition>

In a case in which the first evaluation wavelength is used, the ratio of the amount of light in the light amount evaluation region to the amount of light in the region of the optical system 16 corresponding to the center of the image formation plane is equal to or greater than 35%.

<Eighth Processing Condition>

In a case in which the second evaluation wavelength is used, the value of the MTF of the optical system 16 acquired at half of the Nyquist frequency of the imaging element 22 is equal to or greater than 25%.

As can be seen from FIG. 7 which will be described below, in a case in which the restoration process based on the optical transfer function is performed for the target image captured using the optical system 16 satisfying the fifth processing condition and the sixth processing condition, the resolution performance of the target image is improved by about 25% or more by the restoration process. In a case in which the restoration process based on the optical transfer function is performed for the target image captured using the optical system 16 satisfying the seventh processing condition and the eighth processing condition, the resolution performance of the target image is improved by about 40% or more by the restoration process.

In addition, the optical system 16 may satisfy other conditions in addition to the above-mentioned conditions.

For example, in a case in which the value of the MTF of the optical system 16 is small and the relative illumination is excessively high, the value of the MTF of the optical system 16 is likely to be significantly increased by 60% or more by the restoration process based on the optical transfer function. In this case, an artifact, such as a false color component amplified by a ringing and demosaicing process in a saturated pixel is excessively emphasized and image quality is degraded. In addition, the difference between the resolution of a defocused image and the resolution of a focused image is excessively large, which may cause a large visual discomfort when an image is observed.

In order to prevent the degradation of image quality caused by the emphasis of the artifact or an unnatural difference between the senses of resolution of images, conditions other than the first to eighth processing conditions may be applied as the conditions for performing the restoration process based on the optical transfer function. For example, the expression indicated by the following ninth processing condition (condition (10)) may be satisfied in the following case: in a case in which the second evaluation wavelength is used, the value of the MTF of the optical system 16 acquired at half of the Nyquist frequency of the imaging element 22 is represented by "A %"; and in a case in which the first evaluation wavelength is used, the ratio of the amount of light in the light amount evaluation region to the amount of light in the region of the optical system 16 corresponding to the center of the image formation plane is represented by "B %".

<Ninth Processing Condition>

$$A\% \geq 0.75 \times B\% - 40\%$$

Figure 7:
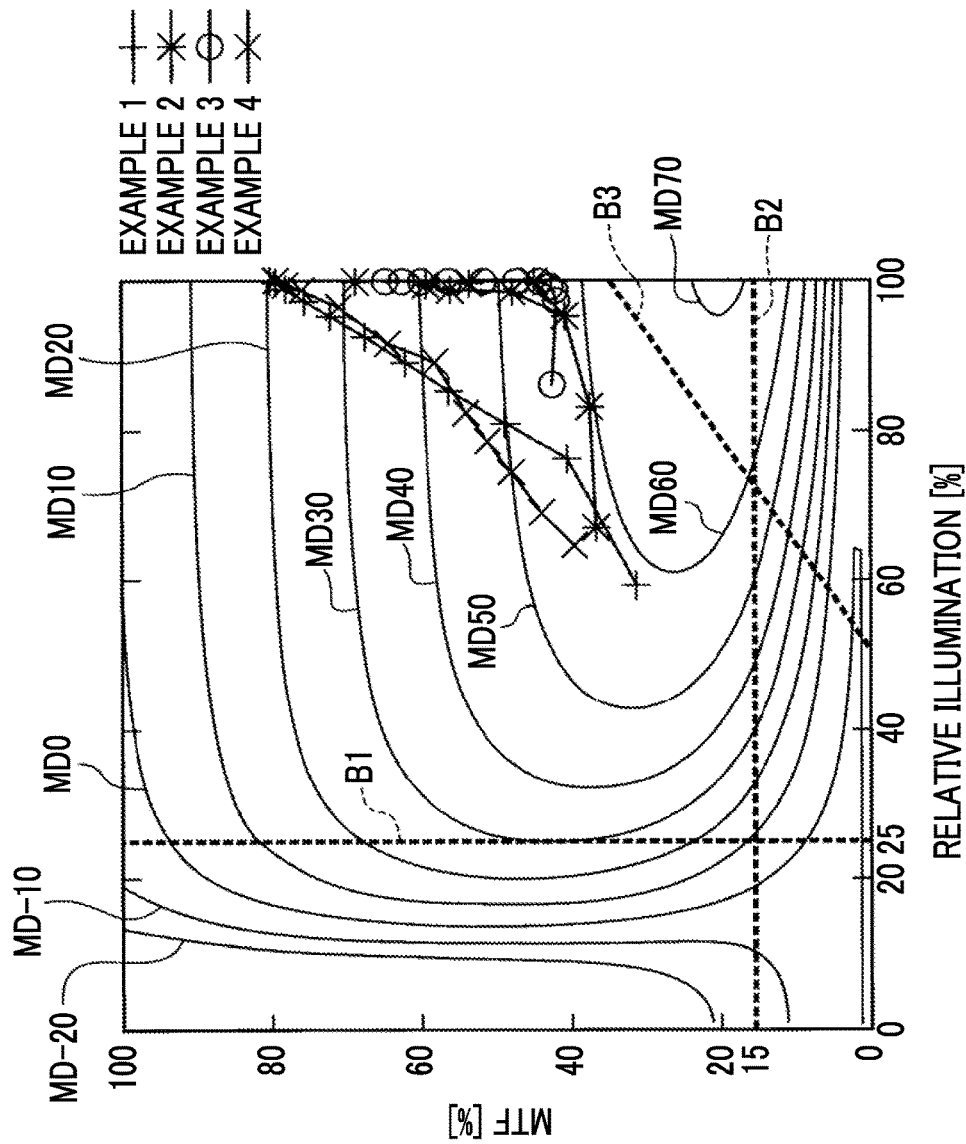
FIG. 7 is a diagram illustrating an example of the optical performance of an optical system according to a second embodiment.

The ninth processing condition is defined by a line B3 in FIGS. 6 and 7 and the optical system 16 satisfying the ninth processing condition is included in a region (including the line B3) on the upper side of the line B3 in FIGS. 6 and 7. In this case, the restoration process performed by the restoration processing unit 41 is applied to the target image captured using the optical system 16 satisfying the ninth processing condition.

FIG. 7 is a diagram illustrating an example of the optical performance of an optical system 16 according to the second embodiment. In FIG. 7, the horizontal axis indicates "relative illumination (%)" and the vertical axis indicates "the value of the MTF (%)". In addition, the SN ratio is assumed to be "24 decibels (dB)". In addition, in FIG. 7, lines represented by reference numerals "MD-20", "MD-10", "MD0", "MD10", "MD20", "MD30", "MD40", "MD50", "MD60", and "MD70" indicate the difference (%) between the values of the MTF before and after the restoration process based on the optical transfer function and indicate regions in which "the value of the MTF (%) of an image after the restoration process—the value of the MTF (%) of an image before the restoration process" is "−20%", "−10%", "0%", "10%", "20%", "30%", "40%", "50%", "60%", and "70%", respectively.

For example, for an image captured using the optical system 16 in which the "relative illumination (%)" and "the value of the MTF (%)" are present in a region that is closer to the positive side than the line "MD0" (a region on the right side of the line MD0 in FIG. 7), "the value of the MTF (%) of an image after the restoration process–the value of the MTF (%) of an image before the restoration process" is greater than 0% and the image restoration effect (resolution increasing effect) of the restoration process is expected. Similarly, for an image captured using the optical system 16 in which the "relative illumination (%)" and "the value of the MTF (%)" are present in a region that is closer to the positive side than the line "MD20" (a region on the right side of the line MD20 in FIG. 7), the value of the MTF can be increased by at least 20% by the restoration process based on the optical transfer function.

For example, a region in which the relative illumination defined in the second processing condition (the ratio of the amount of light in the light amount evaluation region to the amount of light in the region of the optical system 16 corresponding to the center of the image formation plane) is "equal to or greater than 25%" means a region (including a line B1) on the right side of the line B1 in FIG. 7. In addition, a region in which the value of the MTF' of the optical system 16 is "equal to or greater than 15%" which is defined in the third processing condition means a region (including a line B2) on the upper side of the line B2 in FIG. 7. Therefore, the optical system 16 satisfying the second processing condition and the third processing condition is included in the upper right region surrounded by the line B1 and the line B2 in FIG. 7.

Therefore, as can be seen from FIG. 7, in a case in which the restoration process based on the optical transfer function is performed for the target image captured using the optical system 16 satisfying the second processing condition and the third processing condition, the MTF of the target image can be improved by about 10% or more. In a case in which the optical system 16 satisfies the second processing condition and the third processing condition, the value of the MTF of the optical system 16 is excessively large (in the range in which the MTF is equal to or greater than about 90%), and the relative illumination is relatively low (in the range in which the relative illumination is equal to or less than about 60%), the value of the MTF of the target image is likely to be reduced by the restoration process. This is a phenomenon caused by the fact that reducing the frequency component is effective in image restoration for minimizing a mean square error in order to improve the low SN ratio of the imaging element 22 illustrated in FIG. 2 rather than to increase the nominal value of the MTF. However, in a case in which the original value of the MTF of the optical system 16 is sufficiently large and the MTF is sufficiently reduced by the restoration process, the visual influence of the restoration process is so small as to be negligible. Therefore, in a case in which the object of the invention is considered, the reduction of the MTF by the restoration process which is so small as to be negligible does not substantially affect the effect of the invention.

The fourth processing condition means that the difference between the MTFs before and after the restoration process based on the optical transfer function (that is, "the value of the MTF (%) of an image after the restoration process–the value of the MTF (%) of an image before the restoration process") is greater than 0%, which will be described below. Therefore, the optical system 16 satisfying the fourth processing condition is included in a region that is closer to the positive side than the line MD0 in FIG. 7 (a region on the right side of the line MD0 in FIG. 7).

The image processing device 40 illustrated in FIG. 3 is suitable in a case in which the optical system 16 and the imaging element 22 are integrally provided and a specific optical system 16 satisfying "the first to third processing conditions" and/or "the first processing condition and the fourth processing condition" is regularly used to capture images. However, the optical system 16 may be interchangeable.

Figure 8:
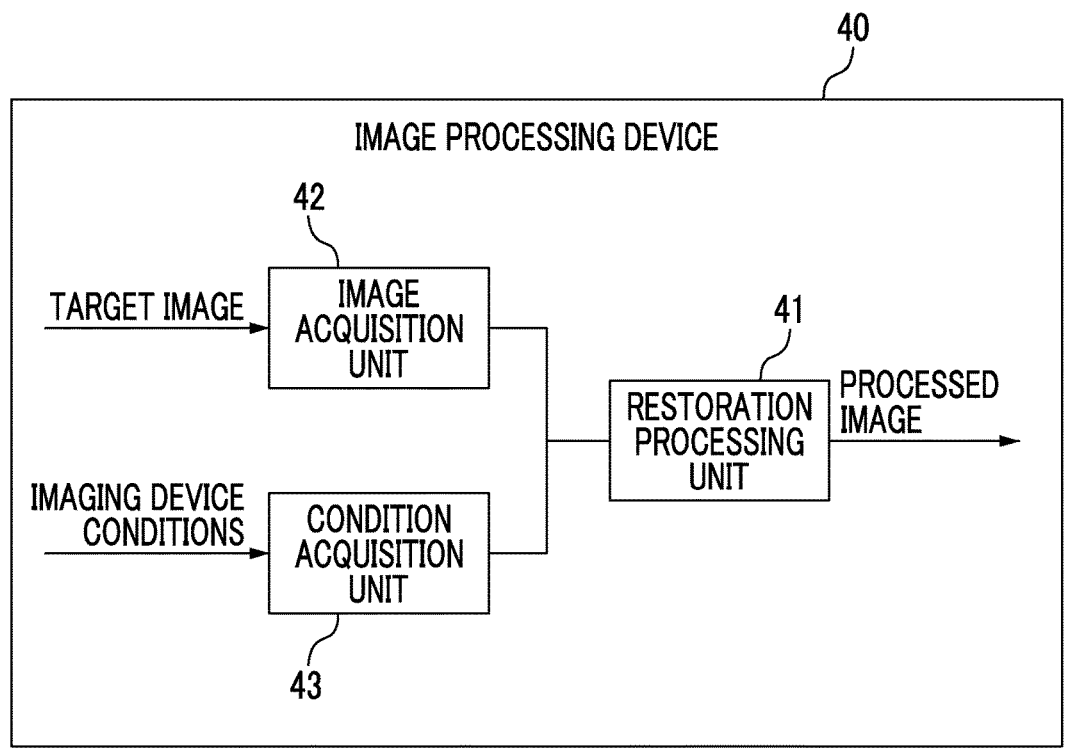
FIG. 8 is a block diagram illustrating another example of the functional configuration of the image processing device.

FIG. 8 is a block diagram illustrating another example of the functional configuration of the image processing device 40. In this example, the image processing device 40 includes an image acquisition unit 42 that acquires a target image and a condition acquisition unit 43 that acquires imaging device conditions indicating the information of the optical system 16 when the target image is captured, in addition to the restoration processing unit 41.

For example, in a case in which the image processing device 40 according to this example is applied to the first embodiment, the restoration processing unit 41 can perform the restoration process based on the optical transfer function of the optical system 16 for the target image in a case in which the imaging device conditions acquired by the condition acquisition unit 43 satisfy the first to third processing conditions. That is, the restoration processing unit 41 determines whether the first to third processing conditions are satisfied and performs the restoration process on the basis of the determination result.

Similarly, in a case in which the image processing device 40 according to this example is applied to the second embodiment, the restoration processing unit 41 can perform the restoration process based on the optical transfer function of the optical system 16 for the target image in a case in which the imaging device conditions acquired by the condition acquisition unit 43 satisfy the first and fourth processing conditions. That is, the restoration processing unit 41 determines whether the first and fourth processing conditions are satisfied and performs the restoration process on the basis of the determination result.

As such, the image processing device 40 illustrated in FIG. 8 determines whether to perform the restoration process on the basis of the determination result of the conditions. Therefore, the image processing device 40 is suitably used in a case in which the optical system 16 is interchangeable and the optical system 16 used for imaging is changed.

The object to which the image processing device 40 (see FIG. 3 and FIG. 8) is applied is not limited to the surveillance camera system 20. The image processing device 40 may be applied to other apparatuses, such as a digital camera in which the optical system 16 and the imaging element 22 are integrally provided, a digital camera in which the optical system 16 is detachably mounted on a main body unit provided with the imaging element 22, and a computer that can perform image processing.

Figure 9:
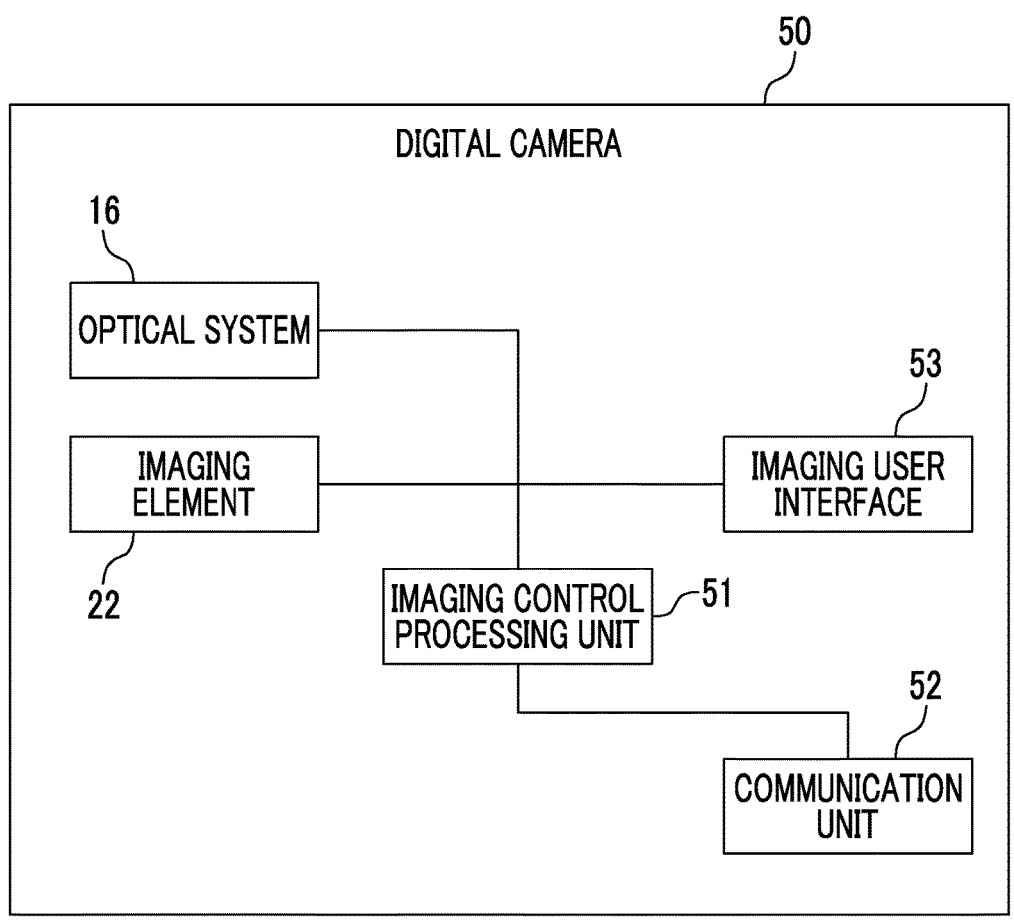
FIG. 9 is a block diagram illustrating another example of the functional configuration of the imaging device and particularly illustrates an example of the functional configuration suitable for a digital camera such as a compact digital camera in which an optical system and an imaging element are integrally provided.

FIG. 9 is a block diagram illustrating another example of the functional configuration of the imaging device and particularly illustrates an example of the functional configuration suitable for a digital camera 50 such as a compact digital camera in which the optical system 16 and the imaging element 22 are integrally provided. In this example, the digital camera 50 includes the optical system 16, the imaging element 22, an imaging control processing unit 51, a communication unit 52, and an imaging user interface 53 which are integrally provided. The imaging control processing unit 51 controls the overall operation of the optical system 16, the imaging element 22, the communication unit 52, and the imaging user interface 53. The imaging control processing unit 51 controls the optical system 16 and the imaging element 22 in response to various kinds of data and various commands input by the user through the imaging user interface 53 such that imaging is performed. The imaging control processing unit 51 can perform various processes for an image output from the imaging element 22 as the target image and can transmit the images before and after the processes to an external apparatus through the communication unit 52.

Therefore, the image processing device 40 (particularly, see FIG. 3) may be provided in the imaging control processing unit 51 of the digital camera 50 illustrated in FIG. 9. The imaging control processing unit 51 (the restoration processing unit 41 of the image processing device 40) can perform the restoration process based on the optical transfer function of the optical system 16 in a case in which the imaging device conditions satisfy "the first to third processing conditions", "the first processing condition and the fourth processing condition", "the first processing condition, the fifth processing condition, and the sixth processing condition", "the first processing condition, the seventh processing condition, and the eighth processing condition", or "each group of the conditions and the ninth processing condition".

Figure 10:
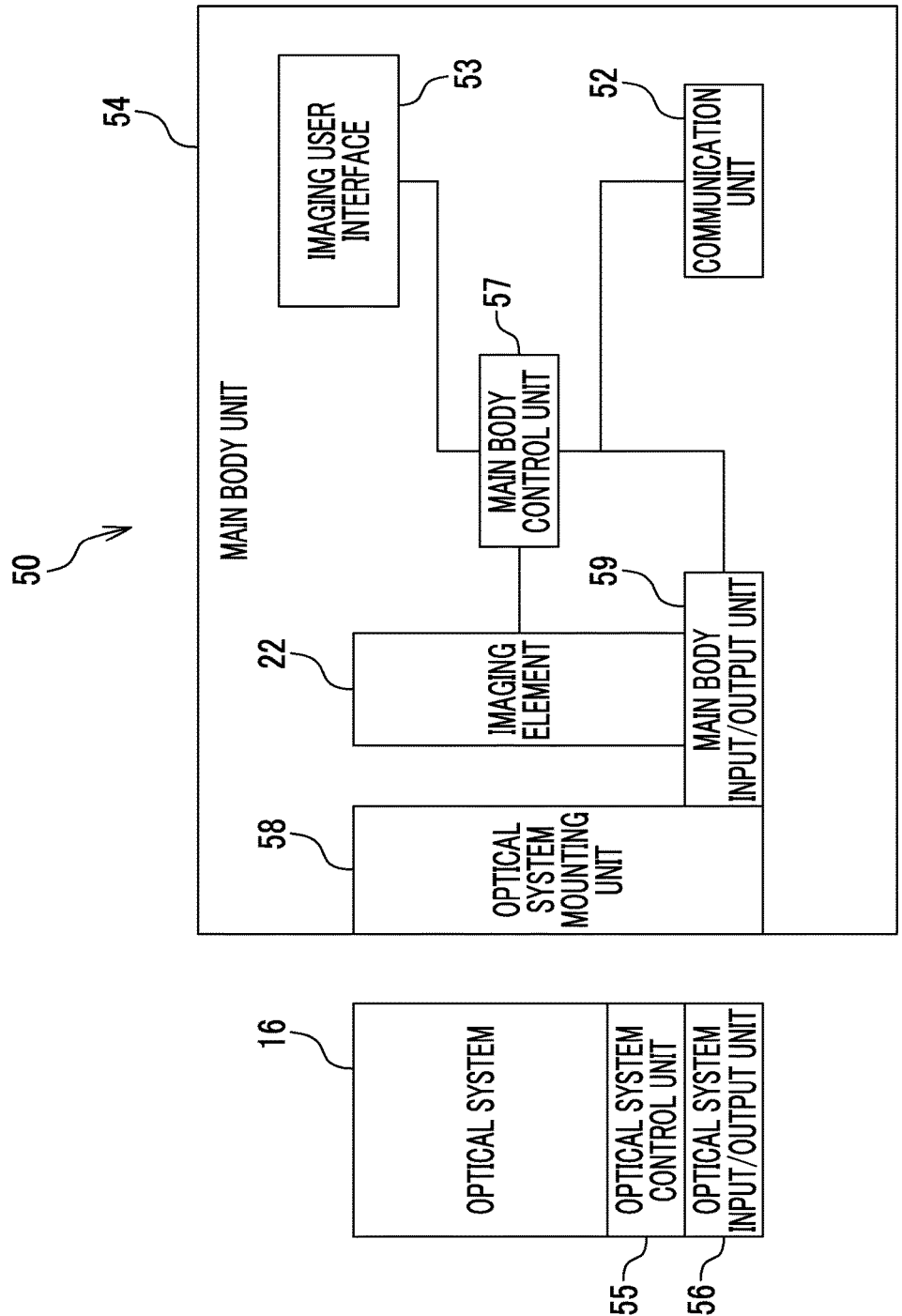
FIG. 10 is a block diagram illustrating still another example of the functional configuration of the imaging device and particularly illustrates an example of the functional configuration suitable for a digital camera such as an interchangeable lens camera in which an optical system is detachably mounted on a main body unit.

FIG. 10 is a block diagram illustrating another example of the functional configuration of the imaging device and particularly illustrates an example of the functional configuration suitable for a digital camera 50 such as an interchangeable lens camera in which the optical system 16 is detachably mounted on a main body unit 54. The digital camera 50 according to this example includes the optical system 16 and the main body unit 54. The optical system 16 includes an optical system control unit 55 and an optical system input/output unit 56 which are integrally provided and is fitted to an optical system mounting unit 58 of the main body unit 54 to be mounted on the main body unit 54. The main body unit 54 includes the imaging element 22, the optical system mounting unit 58, a main body control unit 57, a main body input/output unit 59, the communication unit 52, and the imaging user interface 53. The optical system 16 is detachably attached to the optical system mounting unit 58 and the imaging element 22 receives imaging light through the optical system 16 mounted on the optical system mounting unit 58 and outputs an image. The main body input/output unit 59 can be connected to the optical system input/output unit 56 when the optical system 16 is fitted to the optical system mounting unit 58 and can transmit and receive data. The optical system control unit 55 and the main body control unit 57 can transmit and receive data through the optical system input/output unit 56 and the main body input/output unit 59.

The main body control unit 57 transmits a control signal to the optical system control unit 55 in response to various kinds of data and various commands input by the user through the imaging user interface 53 and the optical system control unit 55 controls the optical system 16 on the basis of the control signal. The main body control unit 57 can control the imaging element 22 such that imaging is performed. The main body control unit 57 can perform various processes, using an image output from the imaging element 22 as the target image, and can transmit the images before and after the processes to external apparatuses through the communication unit 52.

Therefore, the image processing device 40 (particularly, see FIG. 8) may be provided in the main body control unit 57 of the digital camera 50 illustrated in FIG. 10. The main body control unit 57 (the restoration processing unit 41 of the image processing device 40) can perform the restoration process based on the optical transfer function of the optical system 16 in a case in which the imaging device conditions satisfy "the first to third processing conditions", "the first processing condition and the fourth processing condition", "the first processing condition, the fifth processing condition, and the sixth processing condition", "the first processing condition, the seventh processing condition, and the eighth processing condition", or "each group of the conditions and the ninth processing condition".

Figure 11:
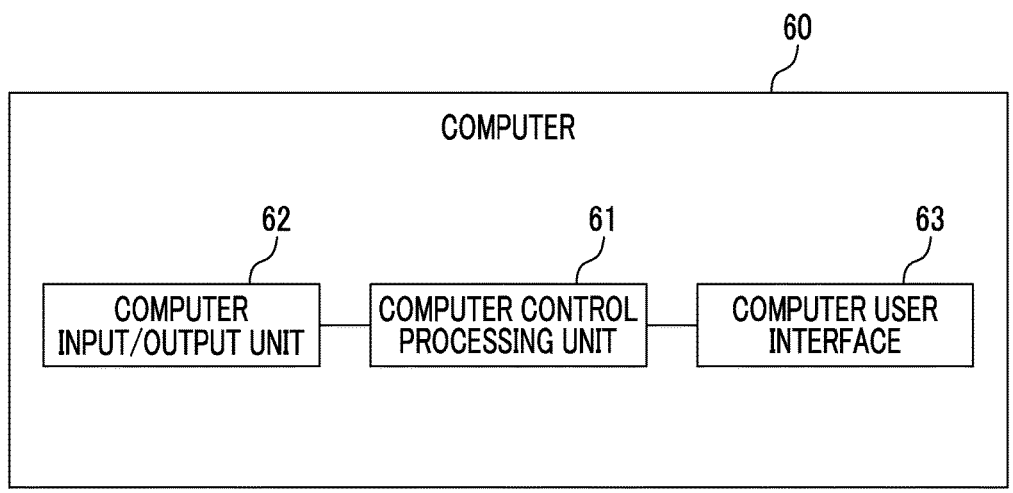
FIG. 11 is a block diagram illustrating an example of the functional configuration of a computer and particularly illustrates an example of the functional configuration to which the image processing device (particularly, see FIG. 8) can be applied.

FIG. 11 is a block diagram illustrating an example of the functional configuration of a computer 60 and particularly illustrates an example of the functional configuration to which the image processing device 40 (particularly, see FIG. 8) can be applied. The computer 60 according to this example includes a computer control processing unit 61, a computer input/output unit 62, and a computer user interface 63. The computer input/output unit 62 is connected to an external apparatus, such as the digital camera 50, and transmits and receives data to and from the external apparatus. The computer user interface 63 includes an operation unit including a pointing device, such as a mouse, and a keyboard that can be directly operated by the user and a display unit that can present various kinds of information to the user. The computer control processing unit 61 is connected to the computer input/output unit 62 and the computer user interface 63, receives data, such as image data, through the computer input/output unit 62, and performs various processes in response to various kinds of data and various commands input by the user through the computer user interface 63.

Therefore, the image processing device 40 (particularly, see FIG. 8) may be provided in the computer control processing unit 61 of the computer 60 illustrated in FIG. 11. The computer control processing unit 61 (image processing device 40) can perform the restoration process based on the optical transfer function of the optical system 16 in a case in which the imaging device conditions satisfy "the first to third processing conditions", "the first processing condition and the fourth processing condition", "the first processing condition, the fifth processing condition, and the sixth processing condition", "the first processing condition, the seventh processing condition, and the eighth processing condition", or "each group of the conditions and the ninth processing condition".

The "restoration process based on the optical transfer function" means an image restoration process derived from the optical transfer function (OTF) obtained by performing two-dimensional Fourier transform for a point spread function (PSF) of the optical system 16 and is also referred to as a point image restoration process. The "restoration process based on the optical transfer function" may be a process using a filter created on the basis of the OTF, a process using a filter created on the basis of an MTF which is an absolute value component of the OTF and/or a phase transfer function (PTF) indicating phase shifting, or a process using a filter created on the basis of the PSF. The concept of the "optical transfer function" which will be described below includes the MTF, the PTF, and the PSF in addition to the OTF.

The restoration process based on the optical transfer function is a process which corrects the image degraded according to the optical transfer function of the optical system 16, using a restoration filter (inverse filter) directly or indirectly calculated from the optical transfer function, to cancel the degradation of the image and restores the degraded image to the original image. However, in a case in which the gain calculated from the reciprocal of an attenuation characteristic is simply applied to the degraded image, a noise component caused by an imaging system, such as the imaging element 22, is amplified. Therefore, in a case in which a restoration filter with a high amplification factor is applied to an image including a noise component, image degradation that is not negligible occurs in the image after the restoration process.

A Wiener filter has been used in various fields as the restoration filter which is created considering noise caused by the imaging system. According to a restoration process using the Wiener filter, in a case in which the amount of attenuation of the frequency characteristics of an image is significantly more than the amount of noise caused by the imaging system due to the excessive influence of blurring caused by the optical transfer function of the optical system 16, the application of high gain to the image is avoided and the attenuated gain for preferentially reducing the amount of noise caused by the imaging system is applied to the image.

The Wiener filter can also be effectively used in the imaging device according to this embodiment. In a case in which the optical system 16 is designed on the premise of applying the restoration process using the Wiener filter, instead of allowing the degradation of some of the optical performances, it is possible to improve other performances.

Next, a specific example of the optimum design of the optical system 16 on the premise of performing the restoration process based on the optical transfer function will be described.

<Optimum Design of Optical System on the Premise of Performing Restoration Process>

The Wiener filter is a filter that is created in order to minimize the mean square error between a restored image and the original image in a case in which the degradation of image quality is linear and has been known and is used as one of the standards for the design of a linear filter. The frequency characteristic F(f, h) of the Wiener filter is represented by the following expression.

$$F(f, h) = \frac{H^*(f, h)S(f)}{\|H(f, h)\|^2 S(f) + N(f)}$$

$f=(f_x, f_y)$: a two-dimensional spatial frequency of a captured image h: the image height of the captured image H(f, h): the optical transfer function (OTF) of the optical system 16

S(f): the mean square value of the amount of signal of the captured image expected in an assumed imaging condition N(f): the mean square value of the amount of noise of the optical system expected in an assumed imaging condition H*(f, h): the complex conjugate of H(f, h)

Here, in a case in which a reduction in the amount of peripheral light of the optical system 16 is considered, the frequency characteristic F(f, h) of the Wiener filter is represented by the following expression.

$$F(f, h) = \frac{H^*(f, h)S(f)R^2(h)}{\|H(f, h)\|^2 S(f)R^2(h) + N(f)}$$

R(h): relative illumination (0≤R(h)≤1)

The response X(f, h) of a restored image obtained by applying the Wiener filter (restoration filter) with the frequency characteristic represented by the above-mentioned expression to a captured image is represented by the following expression.

$$X(f, h) = F(f, h)H(f, h) = \frac{\|H(f, h)\|^2 S(f)R^2(h)}{\|H(f, h)\|^2 S(f)R^2(h) + N(f)}$$

In a case in which the restoration process based on the optical transfer function is performed, it is preferable to design the optical system 16 not in order to maximize the value of the MTF of the optical system 16 (see "$\|H(f, h)\|$" in the above-mentioned expression) but in order to maximize the value of the MTF after the restoration process (see "X(f, h)" in the above-mentioned expression). In a case in which the optical system 16 is designed in this way, it is possible to optimally determine the MTF and the relative illumination which have the trade-off relationship therebetween with a good balance. In a case in which the user wants to roughly select one of "the improvement of the MTF" and "the improvement of the relative illumination", the user can select the greater of the values in the following expression.

$\partial X/\partial \|H\|$ $\partial X/\partial R$

In order to accurately reflect the trade-off relationship between the MTF and the relative illumination in the restoration filter, an optimum parameter can be calculated by the following expression in which a design parameter of the optical system 16 is represented by "p" and a weighting parameter W(f, h) depending on the frequency f and the image height h satisfies "W(f, h)≥0".

$$\hat{p} = \underset{p}{\operatorname{argmax}} \sum_{f,h} W(f, h) \frac{\|H(f, h, p)\|^2 S(f)R^2(h, p)}{\|H(f, h, p)\|^2 S(f)R^2(h, p) + N(f)}$$

p̂: the optimum parameter

<Determination of Whether MTF is Improved>

In the restoration process using the Wiener filter, in a case in which the number of noise components is large and the number of MTF components is small in the target image, the MTF is not amplified, but is attenuated to attach importance to the suppression of noise. Conditions for preventing this case are represented by the following expression.

X(f,h)≥‖H(f,h)‖

In addition, the following expression can be derived from the above-mentioned expression.

$S(f)R^2(h)\|H(f,h)\|^2 - S(f)R^2(h)\|H(f,h)\| + N(f) \leq 0$

Furthermore, the following expression can be derived from the above-mentioned expression.

SNR(f)=S(f)/N(f)

$SNR(f)R^2(h)\|H(f,h)\|^2 - SNR(f)R^2(h)\|H(f,h)\| + 1 \leq 0$

In a case in which the MTF and the relative illumination satisfy at least the above-mentioned expression with respect to an assumed SN ratio, the MTF can be expected to be improved by the restoration process based on the optical transfer function.

Here, the boundary where "the optical transfer function H(f, h) of the optical system 16" which is an index of image resolution before the restoration process and "the response X(f, h)" which is an index of image resolution after the restoration process satisfy the following conditional expression is considered.

X(f,h)=‖H(f,h)‖

The conditions represented by the following expression need to be satisfied in order to make the image resolution after the restoration process equal to or greater than the image resolution before the restoration process.

$SNR(f)R^2(h) \geq 4$ $$\|H(f, h)\| \geq \frac{1}{2}\left(1 - \sqrt{1 - \frac{4}{SNR(f)R^2(h)}}\right)$$

Therefore, in a case in which the fourth processing condition is satisfied, the improvement of the MTF can be expected.

<Definition of SN Ratio>

The SN ratio is the ratio of a signal component to a noise component in an image. A case in which a captured image 1 is configured so as to be represented by the following expression with a signal component X and a noise component Y of the image is considered.

$I_{i,j} = X_{i,j} + Y_{i,j}$

Here, "i, j" is an index of a pixel and indicates the two-dimensional position of the pixel in the captured image. The SN ratio (SNR) is defined by the following expression on the basis of the above-mentioned expression.

$$SNR = \frac{\sum_{i,j} |X_{i,j}|^2}{\sum_{i,j} |Y_{i,j}|^2}$$

In some cases, instead of the above-mentioned expression, a peak signal-to-noise ratio (PSNR) defined by the following expression is used.

$$PSNR = \frac{N \max_{i,j} |X_{i,j}|^2}{\sum_{i,j} |Y_{i,j}|^2}$$

In general, as the ISO sensitivity based on the International Organization for Standardization (ISO) increases, the amount of light (signal component) received at correct exposure is reduced, but the amount of noise does not change. Therefore, the SN ratio tends to be reduced. In addition, there are various methods that decompose the captured image 1 into the signal component X and the noise component Y. Since the image is not affected by a non-linear noise reduction process during image processing, many measurement charts have been designed.

<Conditions for Guaranteeing Minimum MTF after Restoration Process is Applied>

The conditions to be satisfied in order to make the value of the MTF after the restoration process based on the optical transfer function is applied greater than "α (where "0≤α≤1")" (see the following expression) are calculated.

$$X(f,h) \geq \alpha$$

The above-mentioned expression is deformed to derive the following expression.

$$\frac{\|H(f,h)\|^2 S(f) R^2(h)}{\|H(f,h)\|^2 S(f) R^2(h) + N(f)} \geq \alpha$$

$$\|H(f,h)\| \geq \sqrt{\frac{\alpha}{1-\alpha} \frac{N(f)}{S(f)} \frac{1}{R(h)}}$$

$$\|H(f,h)\| \times R(h) \geq \sqrt{\frac{\alpha}{1-\alpha} \frac{1}{SNR(f)}}$$

The above-mentioned expression indicating that the product of the MTF of the original image and the relative illumination before the restoration process is applied is greater than a constant determined on the basis of the SN ratio and "α" indicates conditions for guaranteeing the minimum MTF after the restoration process is applied.

Next, a specific example of the configuration of the optical system 16 will be described.

Example 1

Figure 12:
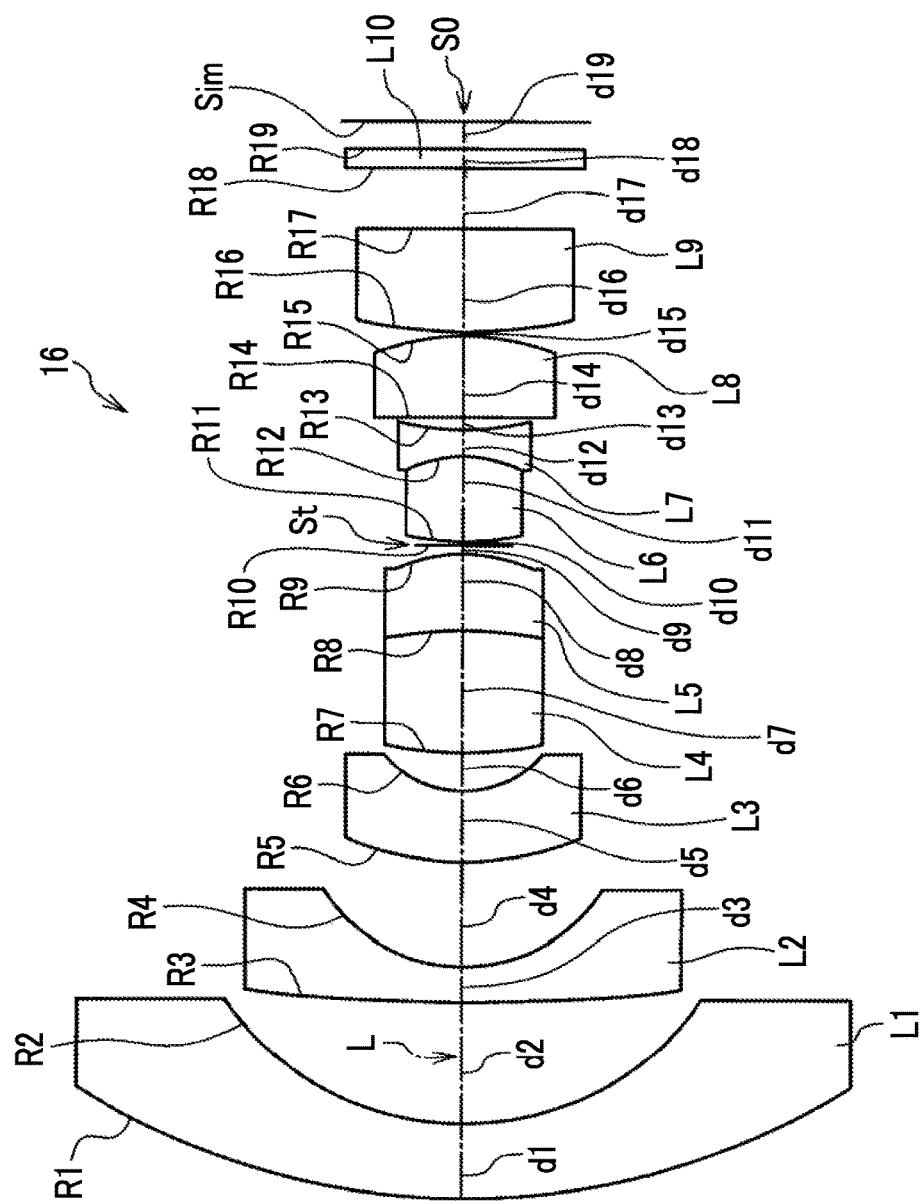
FIG. 12 is a cross-sectional view illustrating an optical system according to Example

FIG. 12 is a cross-sectional view illustrating an optical system 16 according to Example 1. The left side of FIG. 12 is an object side (subject side) and the right side thereof is an image side (the side of an image surface Sim).

The optical system 16 according to this example includes "a first optical element L1, a second optical element L2, a third optical element L3, a fourth optical element L4, and a fifth optical element L5", a "stop St", and "a sixth optical element L6, a seventh optical element L7, an eighth optical element L8, a ninth optical element L9, and a tenth optical element L10" which are arranged in this order from the object side.

In the optical system 16 according to this example, the stop St is fixed between "the first optical element L1, the second optical element L2, the third optical element L3, the fourth optical element L4, and the fifth optical element L5" and "the sixth optical element L6, the seventh optical element L7, the eighth optical element L8, the ninth optical element L9, and the tenth optical element L10". In addition, the image surface Sim indicates the image formation plane of the optical system 16. During imaging, the imaging surface of the imaging element 22 is located at the position of the image surface Sim. The stop St illustrated in FIG. 12 does not indicate a size or a shape and indicates a position on an optical axis L. In FIG. 12, reference numeral "S0" indicates a position corresponding to the center of the image formation plane of the optical system 16.

FIG. 13 is a table (Table 2) illustrating the basic data of the optical system 16 according to Example 1. In FIG. 13, a field "surface number R" ("1" to "19") indicates an i-th (i=1, 2, 3, ..., 19) surface number that gradually increases toward the image side, with the surface of a component closest to the object side being the first surface (see "R1" to "R19" in FIG. 12).

In FIG. 13, a field "curvature radius r" indicates the curvature radius (mm: millimeters) of each surface number. The sign of the curvature radius is positive in a case in which the surface has a shape that is convex to the object side and is negative in a case which the surface has a shape that is convex to the image side. Surface numbers "14", "17", "18", and "19" mean that the curvature radius is infinite and the shape of the surface is a plane which is perpendicular to the optical axis L and whose normal direction is aligned with the direction of the optical axis L. In addition, a symbol indicating infinity is written to the field of the curvature radius of the surface (surface number "10") corresponding to the stop St in FIG. 13.

In FIG. 13, a field "surface interval d" indicates a surface interval (mm) between each surface with surface number (i) and a surface with surface number (i+1) adjacent to the image side (the right side of FIG. 12) on the optical axis L (see "d1" to "d19" FIG. 12).

In FIG. 13, a field "effective radius er" indicates the radius (mm) of a region (effective imaging region) that effectively operates as the optical system during imaging among the optical surfaces indicated by each surface number.

In FIG. 13, a field "refractive index nd" indicates the refractive index of an optical element between each surface with surface number (i) and the surface with surface number (i+1) adjacent to the image side (the right side of FIG. 12) with respect to the d-line (a wavelength of 587.6 nm).

In FIG. 13, a field "Abbe number vd" indicates the Abbe number of the optical element between each surface with surface number (i) and the surface with surface number (i+1) adjacent to the image side (the right side of FIG. 12) with respect to the d-line.

In FIG. 13, blanks in the field "refractive index nd" and the field "Abbe number vd" mean that there is no corresponding optical element and the corresponding fields are empty (see FIG. 12).

FIG. 14 is a table (Table 3) illustrating the specifications of the optical system 16 according to Example 1. FIG. 14 illustrates the characteristics of the optical system 16 on the basis of the d-line. Specifically, the table includes a "zoom magnification", the focal length "f (mm)" of the entire optical system 16, a back focal length (air-equivalent value) "Bf (mm)", an F-number "Fno", the entire angle of view "2ω(°)", "2y" (mm) that is twice the maximum image height (y), the "total length (mm)" of the optical system 16, and the "maximum diameter φ (mm)" of the optical system 16.

FIG. 15 is a table (Table 4) illustrating the value of the MTF of the optical system 16 according to Example 1. FIG. 15 illustrates "a half angle of view (°)" as an index indicating a position in the optical system 16, the value of the MTF (%) in the tangential direction (see a field "tangential" in FIG. 15), the value of the MTF (%) in the sagittal direction (see a field "sagittal" in FIG. 15), and the smaller (%) of the value of the MTF in the tangential direction and the value of the MTF in the sagittal direction (see a field "min" in FIG. 15). The value of the MTF illustrated in FIG. 15 is a value obtained by using the second evaluation wavelength (see FIG. 5) and by using an evaluation frequency of 80 line pairs/mm (LP/mm). The evaluation frequency corresponds to half of the Nyquist frequency of the imaging element 22.

FIG. 16 is a table (Table 5) illustrating the relative illumination of the optical system 16 according to Example 1. FIG. 16 illustrates "a half angle of view (°)" as an index indicating a position in the optical system 16 and "relative illumination (%)". The relative illumination illustrated in FIG. 16 is based on the amount of light in the region (light amount evaluation region) of the optical system 16 in which the distance from the center of the image formation plane of the optical system 16 in the image formation plane is 80% of half of the length of the diagonal line of the imaging surface of the imaging element 22. In addition, the relative illumination illustrated in FIG. 16 is a value obtained by using a wavelength of 546.1 nm (the first evaluation wavelength) as the evaluation wavelength.

Figure 17:
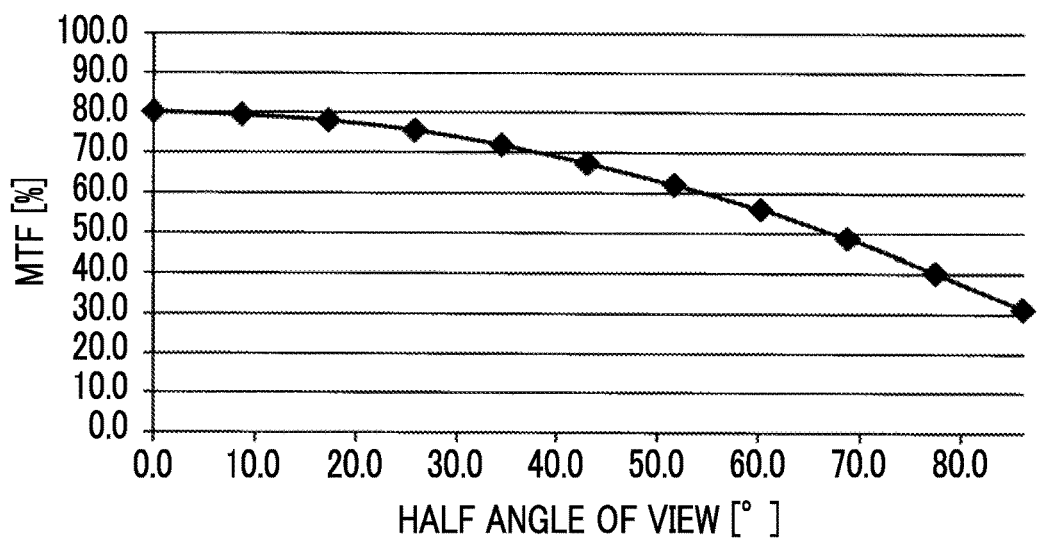
FIG. 17 is a graph illustrating the MTF of the optical system according to Example 1.
Figure 18:
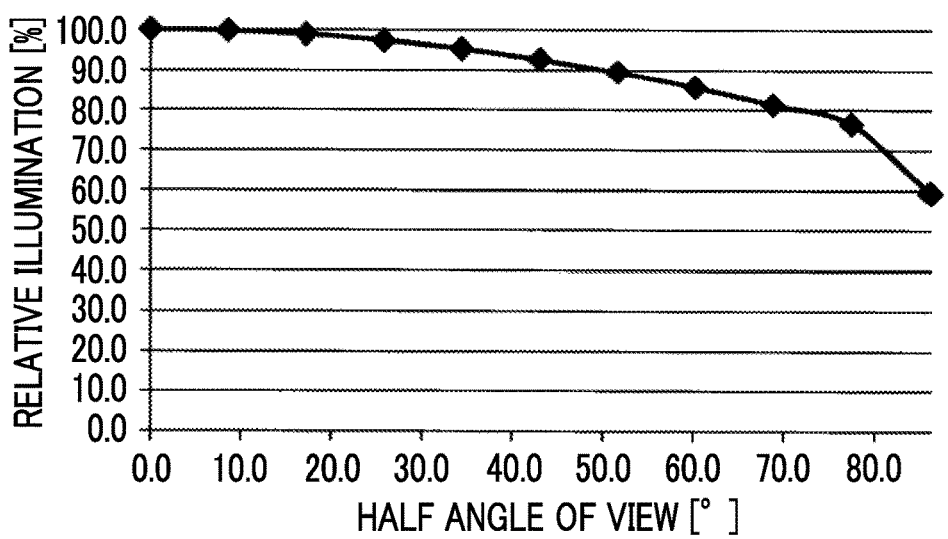
FIG. 18 is a graph illustrating the relative illumination of the optical system according to Example 1.

FIG. 17 is a graph illustrating the MTF of the optical system 16 according to Example 1. In FIG. 17, the horizontal axis indicates "a half angle of view (°)" which is used as an index indicating a position in the optical system 16 and the vertical axis indicates "the value of the MTF (%)". FIG. 18 is a graph illustrating the relative illumination of the optical system 16 according to Example 1. In FIG. 18, the horizontal axis indicates "a half angle of view (°)" which is used as an index indicating a position in the optical system 16 and the vertical axis indicates "relative illumination (%)".

The value of the MTF and the relative illumination of the optical system 16 according to Example 1 are also plotted in FIGS. 6 and 7 (see the display of "Example 1" in FIGS. 6 and 7). The plots of "Example 1" and "Example 2", "Example 3", and "Example 4", which will be described below, in FIGS. 6 and 7 are related to the regions of the optical system 16 in which the distance from the center of the image formation plane of the optical system 16 in image formation plane is "100%", "90%", "80%" "70%", "60%", "50%" "40%", "30%", "20%", "10%", and "0%" of half of the length of the diagonal line of the imaging surface of the imaging element 22, respectively.

As described above, the optical system 16 according to Example 1 satisfies the first processing condition (see the field "2ω (°)" in FIG. 14) and satisfies the second processing condition and the third processing condition (see FIGS. 6 and 7 and FIGS. 15 to 18). In a case in which "the restoration process based on the optical transfer function" is performed, using an image captured using the optical system 16 according to Example 1 and the imaging element 22 as the target image, it is possible to effectively improve image resolution while suppressing aberration.

Example 2

In this example, the same elements as those in Example 1 are denoted by the same reference numerals and the detailed description thereof will not be repeated.

Figure 19:
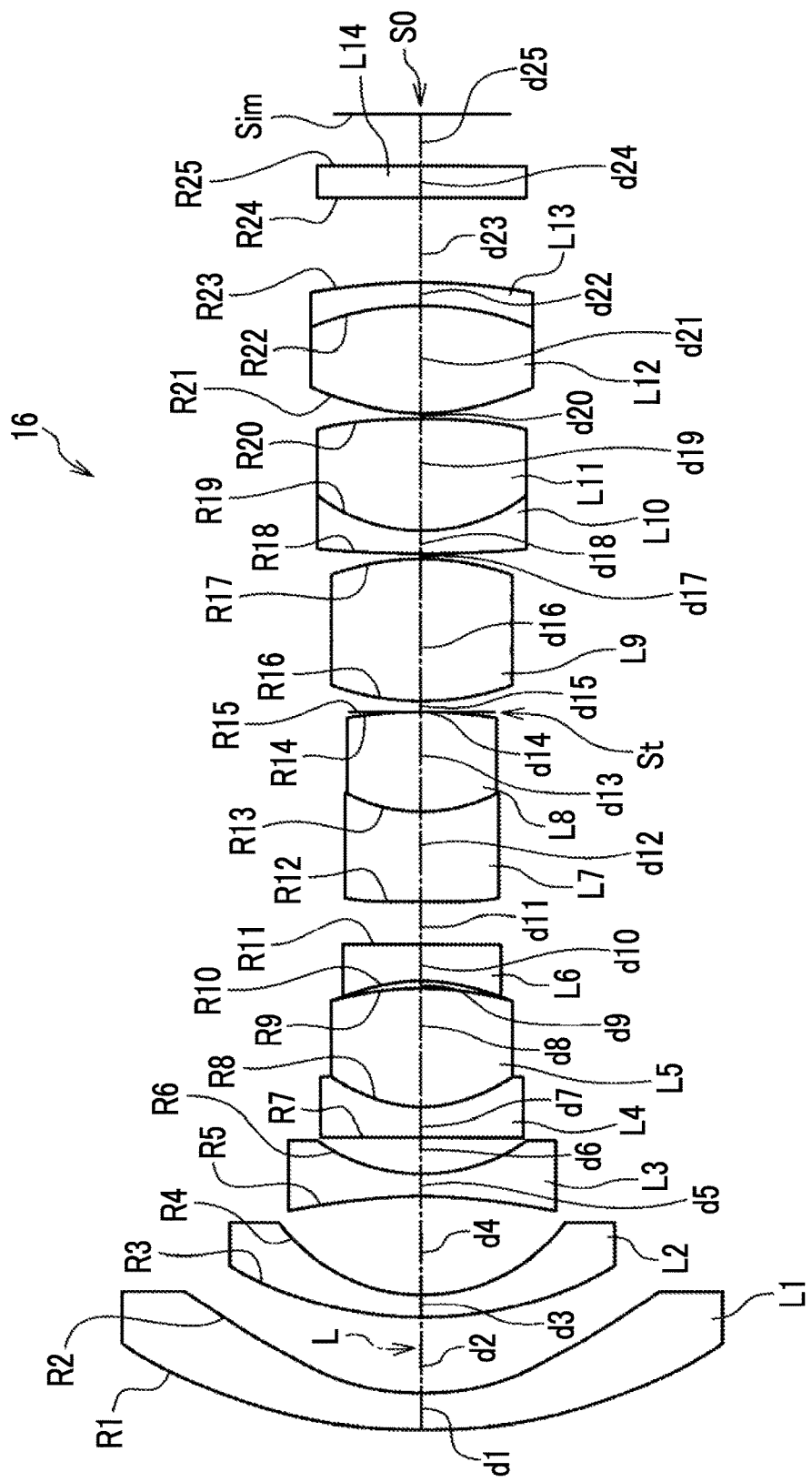
FIG. 19 is a cross-sectional view illustrating an optical system according to Example 2.

FIG. 19 is a cross-sectional view illustrating an optical system 16 according to Example 2.

The optical system 16 according to this example includes "a first optical element L1, a second optical element L2, a third optical element L3, a fourth optical element L4, a fifth optical element L5, a sixth optical element L6, a seventh optical element L7, and an eighth optical element L8", a "stop St", and "a ninth optical element L9, a tenth optical element L10, an eleventh optical element L11, a twelfth optical element L12, a thirteenth optical element L13, and a fourteenth optical element L14" which are arranged in this order from the object side.

FIG. 20 is a table (Table 6) illustrating the basic data of the optical system 16 according to Example 2. FIG. 20 illustrates a "surface number R", a "curvature radius r" (mm), a "surface interval d" (mm), an "effective radius er" (mm), a "refractive index nd", and an "Abbe number vd" with respect to surface numbers 1 to 25 (see "R1" to "R25" in FIG. 19), similarly to FIG. 13.

In the optical system 16 according to Example 2, the first optical element L1 is an aspheric lens in which "a surface with surface number 1" and "a surface with surface number 2" are aspheric surfaces.

FIG. 21 is a table (Table 7) illustrating the specifications of the optical system 16 according to Example 2. FIG. 21 illustrates a "zoom magnification" based on the d-line, the focal length "f (mm)" of the entire optical system 16, a back focal length (air-equivalent value) "Bf (mm)", an F-number "Fno", the entire angle of view "2ω (°)", "2y" (mm) that is twice the maximum image height (y), the "total length (mm)" of the optical system 16, and the "maximum diameter ϕ (mm)" of the optical system 16, similarly to FIG. 14.

FIGS. 22A and 22B are tables illustrating the conic constants "KA" and the aspheric coefficients "A3 to A20" of the aspheric surfaces of the optical system 16 according to Example 2. FIG. 22A (Table 8) illustrates data of "the surface with surface number 1" and FIG. 22B (Table 9) illustrates data of "the surface with surface number 2".

The conic constant "KA" and the aspheric coefficients "A3 to A20" illustrated in FIGS. 22A and 22B are determined by the following expression.

$$Zd = C \cdot h^2 i \{1 + (1-(1+KA) \cdot C^2 \cdot h^2)^{1/2}\} + \Sigma Am \cdot h^m$$

h: image height (a distance from an optical axis)
Zd: aspheric depth (the length of a perpendicular line drawn from a point on an aspheric surface with the image height h to a plane that is tangent to the apex of the aspheric surface and is perpendicular to the optical axis)
C: the reciprocal of paraxial radius of curvature
KA: conic constant
Am: aspheric coefficient (m=3, . . . , n)

In FIG. 22, "E" indicates an exponent. For example, "E-03" means 10 to the power of "−3" (that is, "$10^{-3}$").

FIG. 23 is a table (Table 10) illustrating the value of the MTF of the optical system 16 according to Example 2. FIG. 23 illustrates "a half angle of view (°)" as an index indicating a position in the optical system 16, the value of the MTF (%) in the tangential direction (see a field "tangential" in FIG. 23), the value of the MTF (%) in the sagittal direction (see a field "sagittal" in FIG. 23), and the smaller (%) of the value of the MTF in the tangential direction and the value of the MTF in the sagittal direction (see a field "min" in FIG. 23). The value of the MTF illustrated in FIG. 23 is a value obtained by using the second evaluation wavelength (see FIG. 5) and by using an evaluation frequency of 155 LP/mm. The evaluation frequency corresponds to half of the Nyquist frequency of the imaging element 22.

FIG. 24 is a table (Table 11) illustrating the relative illumination of the optical system 16 according to Example 2. FIG. 24 illustrates "a half angle of view (°)" as an index indicating a position in the optical system 16 and "relative illumination (%)". The relative illumination illustrated in FIG. 24 is based on the amount of light in the region (light amount evaluation region) of the optical system 16 in which the distance from the center of the image formation plane of the optical system 16 in the image formation plane is 80% of half of the length of the diagonal line of the imaging surface of the imaging element 22. In addition, the relative illumination illustrated in FIG. 24 is a value obtained by using a wavelength of 546.1 nm (the first evaluation wavelength) as the evaluation wavelength.

Figure 25:
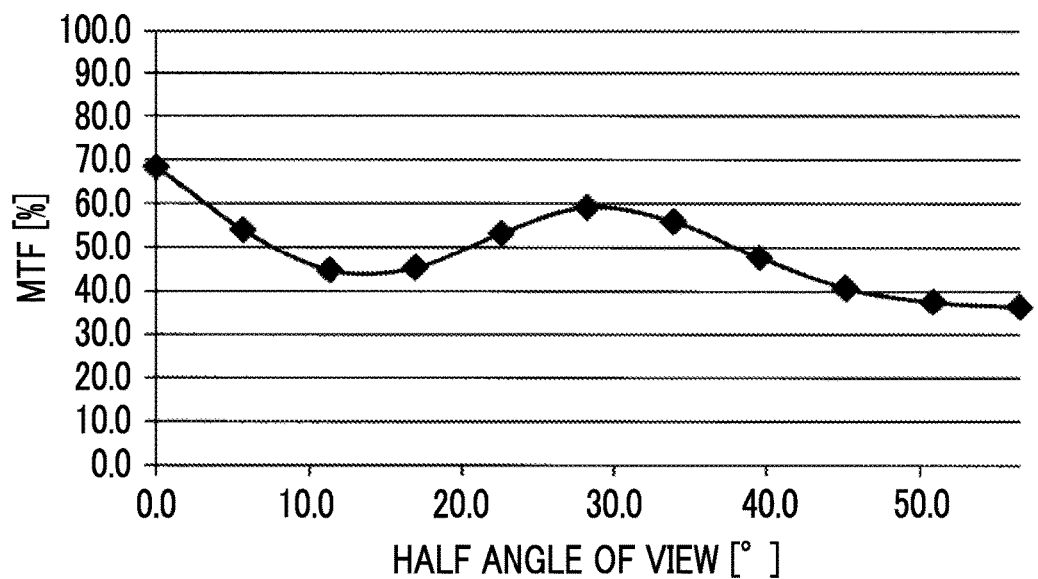
FIG. 25 is a graph illustrating the MTF of the optical system according to Example 2.
Figure 26:
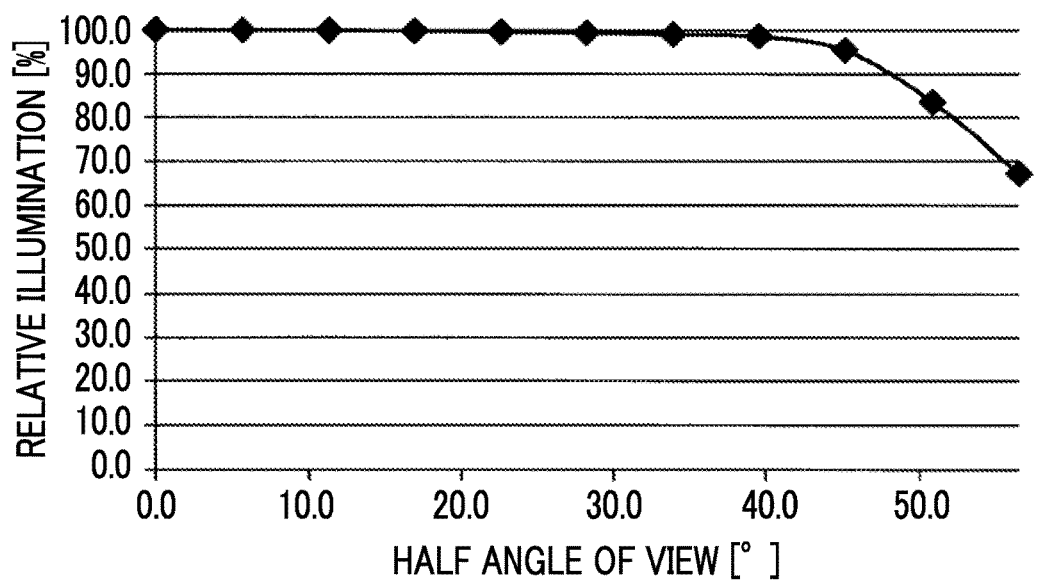
FIG. 26 is a graph illustrating the relative illumination of the optical system according, to Example 2.

FIG. 25 is a graph illustrating the MTF of the optical system 16 according to Example 2. In FIG. 25, the horizontal axis indicates "a half angle of view (°)" which is used as an index indicating a position in the optical system 16 and the vertical axis indicates "the value of the MTF (%)". FIG. 26 is a graph illustrating the relative illumination of the optical system 16 according to Example 2. In FIG. 26, the horizontal axis indicates "a half angle of view (°)" which is used as an index indicating a position in the optical system 16 and the vertical axis indicates "relative illumination (%)". The value of the MTF and the relative illumination of the optical system 16 according to Example 2 are also plotted in FIGS. 6 and 7 (see the display of "Example 2" in FIGS. 6 and 7).

As described above, the optical system 16 according to Example 2 satisfies the first processing condition (see the field "2ω (°)" in FIG. 21) and satisfies the second processing condition and the third processing condition (see FIGS. 6 and 7 and FIGS. 23 to 26). Therefore, in a case in which "the restoration process based on the optical transfer function" is performed, using an image captured using the optical system 16 according to Example 2 and the imaging element 22 as the target image, it is possible to effectively improve image resolution while suppressing aberration.

Example 3

In this example, the same elements as those in Example 1 are denoted by the same reference numerals and the detailed description thereof will not be repeated.

Figure 27:
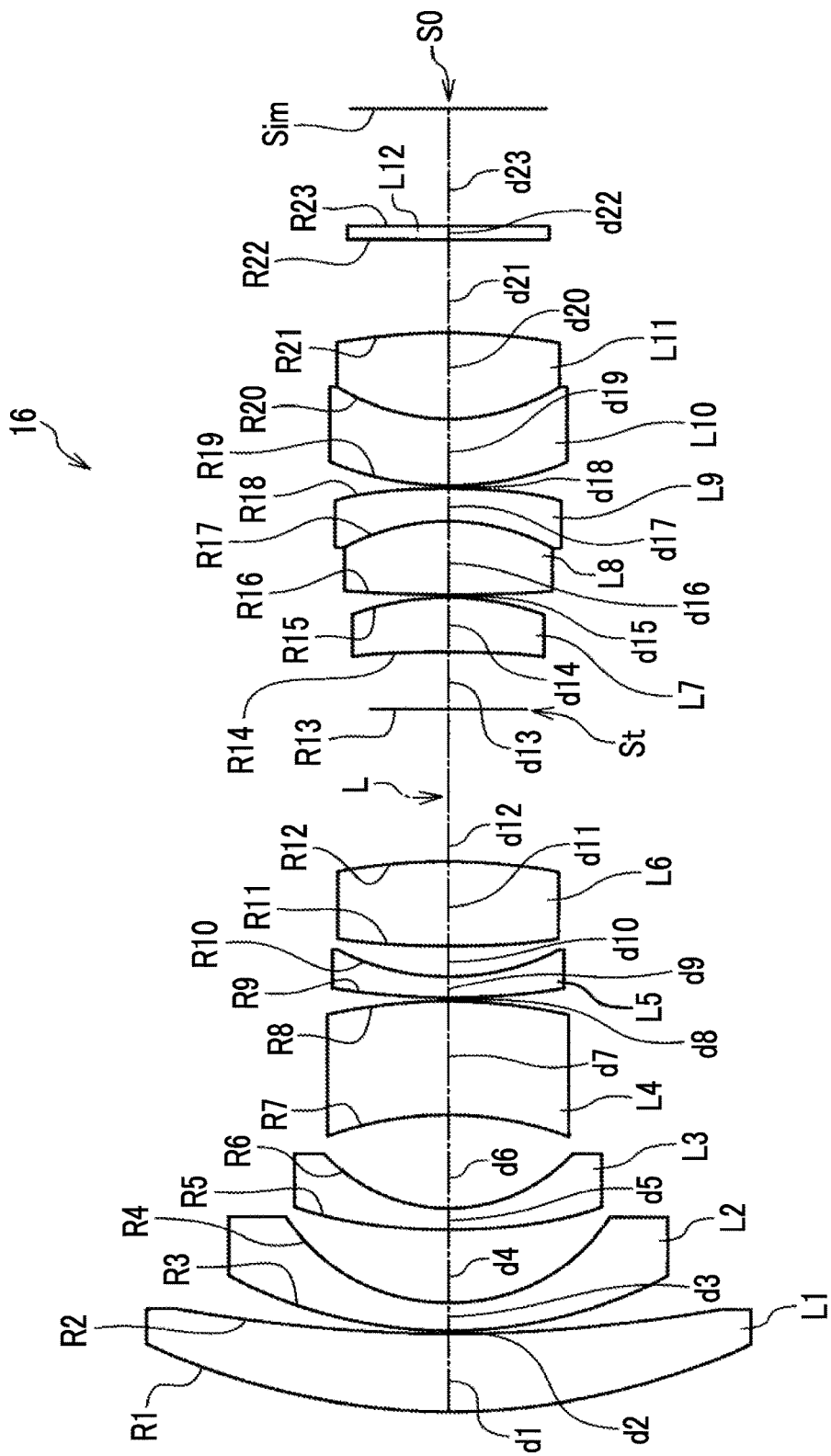
FIG. 27 is a cross-sectional view illustrating an optical system according to Example 3.

FIG. 27 is a cross-sectional view illustrating an optical system 16 according to Example 3.

The optical system 16 according to this example includes "a first optical element L1, a second optical element L2, a third optical element L3, a fourth optical element L4, a fifth optical element L5, and a sixth optical element L6", a "stop St", and "a seventh optical element L7, an eighth optical element L8, a ninth optical element L9, a tenth optical element L10, an eleventh optical element L11, and a twelfth optical element L12" which are arranged in this order from the object side.

FIG. 28 is a table (Table 12) illustrating the basic data of the optical system 16 according to Example 3. FIG. 28 illustrates a "surface number R", a "curvature radius r" (mm), a "surface interval d" (mm), an "effective radius er" (mm), a "refractive index nd", and an "Abbe number vd" with respect to surface numbers 1 to 23 (see "R1" to "R23" in FIG. 27), similarly to FIG. 13.

FIG. 29 is a table (Table 13) illustrating the specifications of the optical system 16 according to Example 3. FIG. 29 illustrates a "zoom magnification" based on the d-line, the focal length "f (min)" of the entire optical system 16, a back focal length (air-equivalent value) "Bf (mm)", an F-number "Fno", the entire angle of view "2ω (°)", "2y" (mm) that is twice the maximum image height (y), the "total length (mm)" of the optical system 16, and the "maximum diameter φ (mm)" of the optical system 16, similarly to FIG. 14.

FIG. 30 is a table (Table 14) illustrating the value of the MTF of the optical system 16 according to Example 3. FIG. 30 illustrates "a half angle of view (°)" as an index indicating a position in the optical system 16, the value of the MTF (%) in the tangential direction (see a field "tangential" in FIG. 30), the value of the MTF (%) in the sagittal direction (see a field "sagittal" in FIG. 30), and the smaller (%) of the value of the MTF in the tangential direction and the value of the MTF in the sagittal direction (see a field "min" in FIG. 30). The value of the MTF illustrated in FIG. 30 is a value obtained by using the second evaluation wavelength (see FIG. 5) and by using an evaluation frequency of 112 LP/mm. The evaluation frequency corresponds to half of the Nyquist frequency of the imaging element 22.

FIG. 31 is a table (Table 15) illustrating the relative illumination of the optical system 16 according to Example 3. FIG. 31 illustrates "a half angle of view (°)" as an index indicating a position in the optical system 16 and "relative illumination (%)". The relative illumination illustrated in FIG. 31 is based on the amount of light in the region (light amount evaluation region) of the optical system 16 in which the distance from the center of the image formation plane of the optical system 16 in the image formation plane is 80% of half of the length of the diagonal line of the imaging surface of the imaging element 22. In addition, the relative illumination illustrated in FIG. 31 is a value obtained by using a wavelength of 546.1 nm (the first evaluation wavelength) as the evaluation wavelength.

Figure 32:
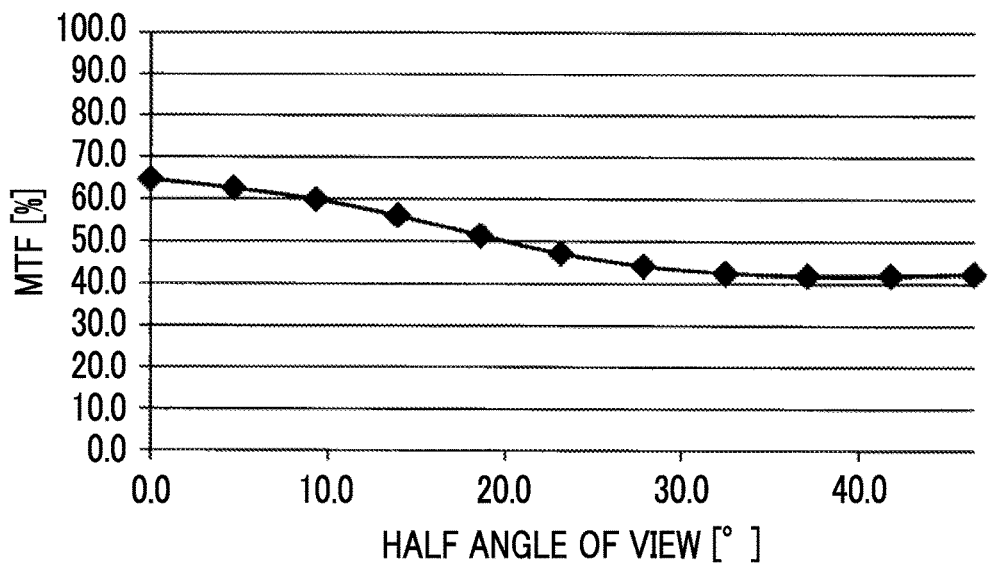
FIG. 32 is a graph illustrating the MTF of the optical system according to Example 3.
Figure 33:
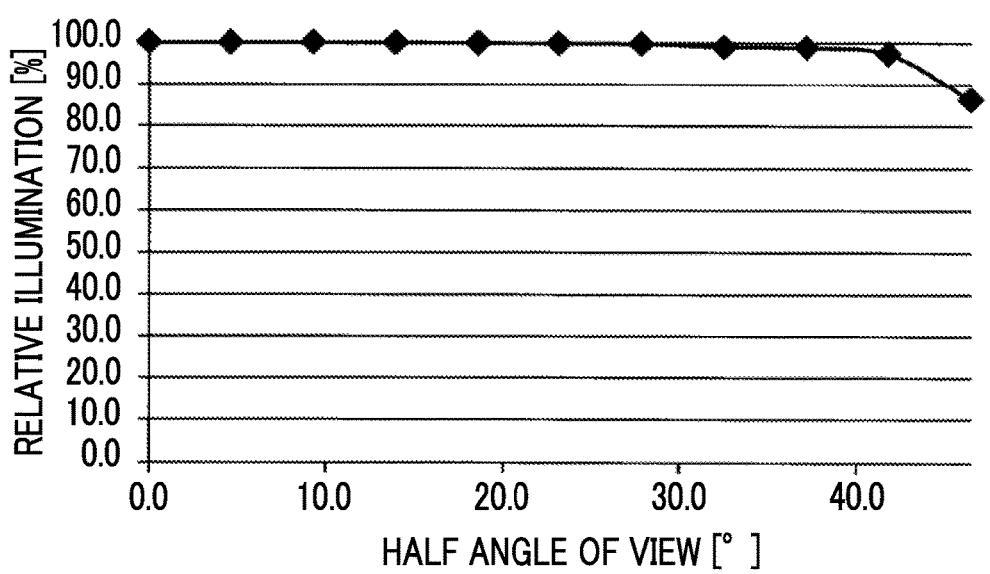
FIG. 33 is a graph illustrating the relative illumination of the optical system according to Example 3.

FIG. 32 is a graph illustrating the MTF of the optical system 16 according to Example 3. In FIG. 32, the horizontal axis indicates "a half angle of view (°)" which is used as an index indicating a position in the optical system 16 and the vertical axis indicates "the value of the MTF (%)". FIG. 33 is a graph illustrating the relative illumination of the optical system 16 according to Example 3. In FIG. 33, the horizontal axis indicates "a half angle of view (°)" which is used as an index indicating a position in the optical system 16 and the vertical axis indicates "relative illumination (%)". The value of the MTF and the relative illumination of the optical system 16 according to Example 3 are also plotted in FIGS. 6 and 7 (see the display of "Example 3" in FIGS. 6 and 7).

As described above, the optical system 16 according to Example 3 satisfies the first processing condition (see the field "2ω (°)" in FIG. 29) and satisfies the second processing condition and the third processing condition (see FIGS. 6 and 7 and FIGS. 30 to 33). Therefore, in a case in which "the restoration process based on the optical transfer function" is performed, using an image captured using the optical system 16 according to Example 3 and the imaging element 22 as the target image, it is possible to effectively improve image resolution while suppressing aberration.

Example 4

In this example, the same elements as those in Example 2 are denoted by the same reference numerals and the detailed description thereof will not be repeated.

Figure 34:
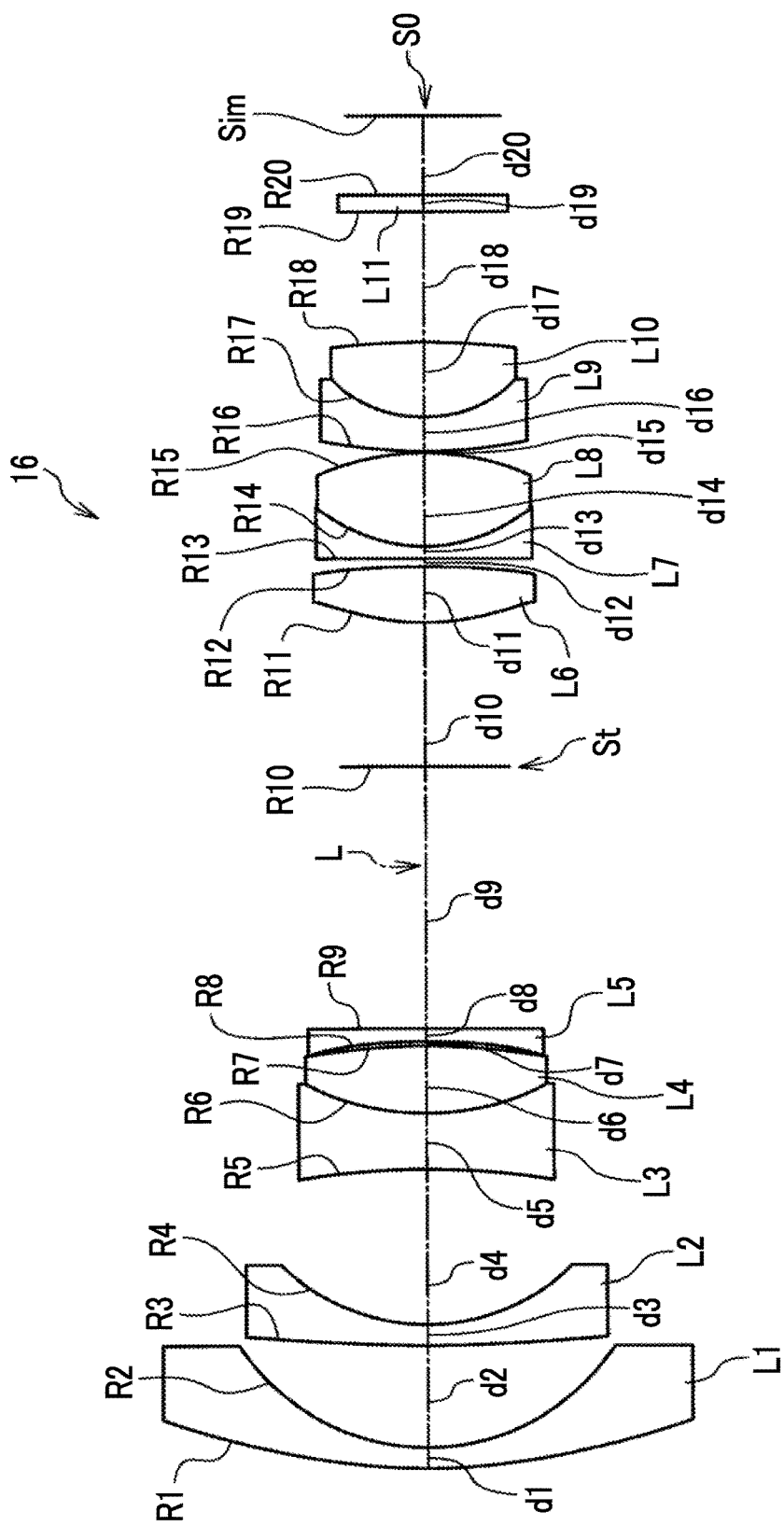
FIG. 34 is a cross-sectional view illustrating an optical system according to Example 4.

FIG. 34 is a cross-sectional view illustrating an optical system 16 according to Example 4.

The optical system 16 according to this example includes "a first optical element L1, a second optical element L2, a third optical element L3, a fourth optical element L4, and a fifth optical element L5", a "stop St", and "a sixth optical element L6, a seventh optical element L7, an eighth optical element L8, a ninth optical element L9, a tenth optical element L10, and an eleventh optical element L11" which are arranged in this order from the object side.

FIG. 35 is a table (Table 16) illustrating the basic data of the optical system 16 according to Example 4. FIG. 35 illustrates a "surface number R", a "curvature radius r" (mm), a "surface interval d" (mm), an "effective radius er" (mm), a "refractive index nd", and an "Abbe number vd" with respect to surface numbers 1 to 20 (see "R1" to "R20" in FIG. 34), similarly to FIG. 13.

FIG. 36 is a table (Table 17) illustrating the specifications of the optical system 16 according to Example 4. FIG. 36 illustrates a "zoom magnification" based on the d-line, the focal length "f (mm)" of the entire optical system 16, a back focal length (air-equivalent value) "Bf (mm)", an F-number "Fno", the entire angle of view "2ω (°)", "2y" (mm) that is twice the maximum image height (y), the "total length (mm)" of the optical system 16, and the "maximum diameter ϕ (mm)" of the optical system 16, similarly to FIG. 14.

In the optical system 16 according to Example 4, the sixth optical element L6 is an aspheric lens in which "a surface with surface number 11" and "a surface with surface number 12" are aspheric surfaces.

FIGS. 37A and 37B are tables illustrating the conic constants "KA" and the aspheric coefficients "A3 to A10" of the aspheric surfaces of the optical system 16 according to Example 4. FIG. 37A (Table 18) illustrates data of "the surface with surface number 11" and FIG. 37B (Table 19) illustrates data of "the surface with surface number 12".

The conic constants "KA" and the aspheric coefficients "A3 to A10" illustrated in FIGS. 37A and 37B are determined by the same expression as that used for the optical system 16 (see FIGS. 22A and 22B) according to Example 2.

FIG. 38 is a table (Table 20) illustrating the value of the MTF of the optical system 16 according to Example 4. FIG. 38 illustrates "a half angle of view (°)" as an index indicating a position in the optical system 16, the value of the MTF (%) in the tangential direction (see a field "tangential" in FIG. 38), the value of the MTF (%) in the sagittal direction (see a field "sagittal" in FIG. 38), and the smaller (%) of the value of the MTF in the tangential direction and the value of the MTF in the sagittal direction (see a field "min" in FIG. 38). The value of the MTF illustrated in FIG. 38 is a value obtained by using the second evaluation wavelength (see FIG. 5) and by using an evaluation frequency of 99 LP/mm. The evaluation frequency corresponds to half of the Nyquist frequency of the imaging element 22.

FIG. 39 is a table (Table 21) illustrating the relative illumination of the optical system 16 according to Example 4. FIG. 39 illustrates "a half angle of view (°)" as an index indicating a position in the optical system 16 and "the relative illumination (%)". The relative illumination illustrated in FIG. 39 is based on the amount of light in the region (light amount evaluation region) of the optical system 16 in which the distance from the center of the image formation plane of the optical system 16 in the image formation plane is 80% of half of the length of the diagonal line of the imaging surface of the imaging element 22. In addition, the relative illumination illustrated in FIG. 39 is a value obtained by using a wavelength of 546.1 nm (the first evaluation wavelength) as the evaluation wavelength.

Figure 40:
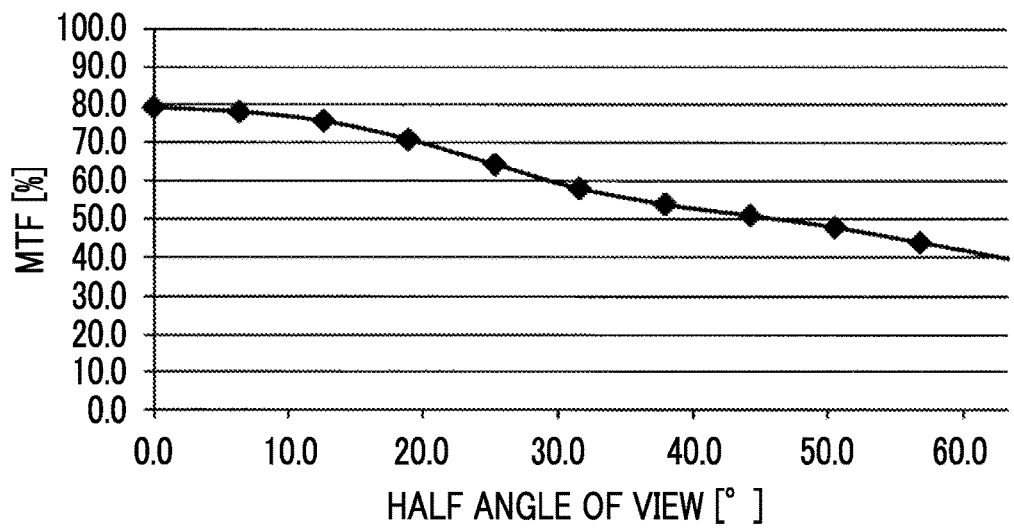
FIG. 40 is a graph illustrating the MTF of the optical system according to Example 4.
Figure 41:
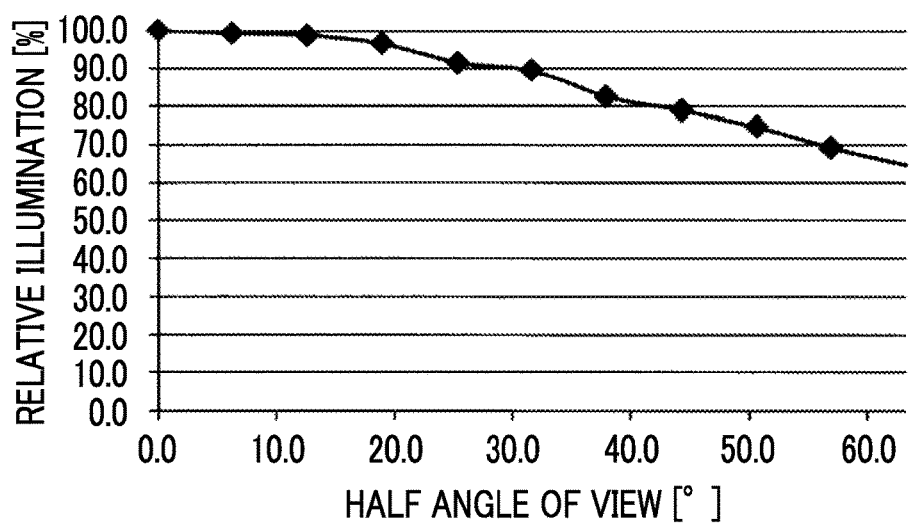
FIG. 41 is a graph illustrating the relative illumination of the optical system according to Example 4.

FIG. 40 is a graph illustrating the MTF of the optical system 16 according to Example 4. In FIG. 40, the horizontal axis indicates "a half angle of view (°)" which is used as an index indicating a position in the optical system 16 and the vertical axis indicates "the value of the MTF (%)". FIG. 41 is a graph illustrating the relative illumination of the optical system 16 according to Example 4. In FIG. 41, the horizontal axis indicates "a half angle of view (°)" which is used as an index indicating a position in the optical system 16 and the vertical axis indicates "relative illumination (%)". The value of the MTF and the relative illumination of the optical system 16 according to Example 4 are also plotted in FIGS. 6 and 7 (see the display of "Example 4" in FIGS. 6 and 7).

As described above, the optical system 16 according to Example 4 satisfies the first processing condition (see the field "2ω (°)" in FIG. 36) and satisfies the second processing condition and the third processing condition (see FIGS. 6 and 7 and FIGS. 38 to 41). Therefore, in a case in which "the restoration process based on the optical transfer function" is performed, using an image captured using the optical system 16 according to Example 4 and the imaging element 22 as the target image, it is possible to effectively improve image resolution while suppressing aberration.

Next, the flow of condition determination will be described.

The image processing device 40 illustrated in FIG. 3 uses, as the target image, the image captured using the optical system 16 that originally satisfies the conditions (see the first to ninth processing conditions) for performing the restoration process based on the optical transfer function. Therefore, in a case in which the image processing device 40 illustrated in FIG. 3 performs the restoration process, it is not necessary to determine whether to perform the restoration process and the restoration process based on the optical transfer function can be performed for the entire target image input to the image processing device 40 (restoration processing unit 41).

In contrast, the image processing device 40 illustrated in FIG. 8 uses, as the target image, the images captured using various optical systems 16, determines whether the conditions (see the first to ninth processing conditions) for performing the restoration process based on the optical transfer function are satisfied, and determines whether to perform the restoration process.

Figure 42:
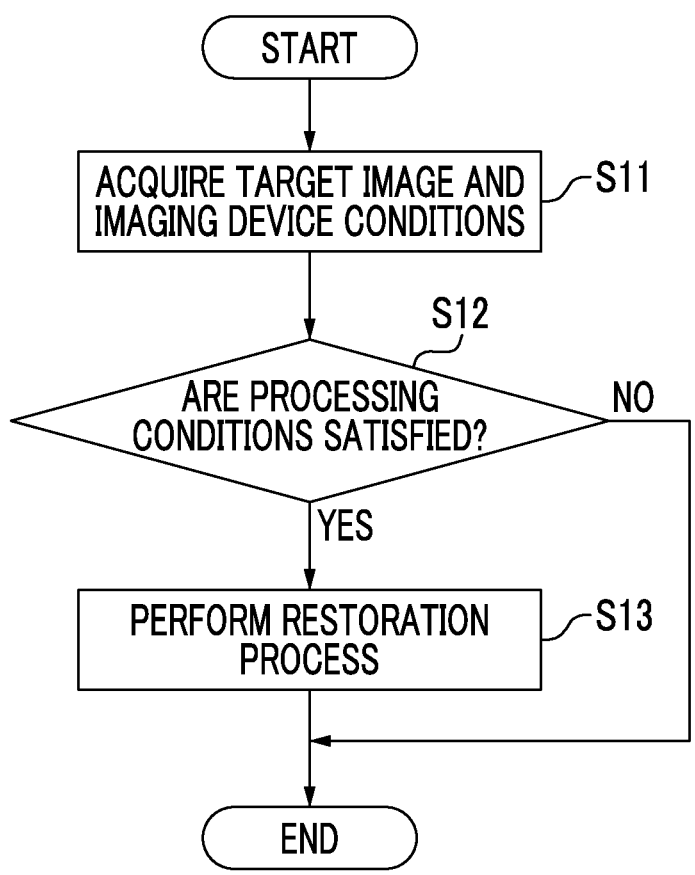
FIG. 42 is a flowchart illustrating an example of the flow of a condition determination process of the image processing device (particularly, a restoration processing unit) illustrated in FIG. 8.

FIG. 42 is a flowchart illustrating the flow of the condition determination process of the image processing device 40 (particularly, the restoration processing unit 41) illustrated in FIG. 8.

First, the restoration processing unit 41 acquires a target image through the image acquisition unit 42 and acquires imaging device conditions through the condition acquisition unit 43 (S11 in FIG. 42).

Then, the restoration processing unit 41 determines whether the conditions (see the first to ninth processing conditions) for performing the restoration process based on the optical transfer function are satisfied (S12). For example, the restoration processing unit 41 determines whether the imaging device conditions satisfy "the first to third processing conditions", "the first processing condition and the fourth processing condition", "the first processing condition, the fifth processing condition, and the sixth processing condition", "the first processing condition, the seventh processing condition, and the eighth processing condition", or "each group of the conditions and the ninth processing condition".

In a case in which it is determined that the conditions (see the first to ninth processing conditions) for performing the restoration process based on the optical transfer function are satisfied (YES in S12), the restoration processing unit 41 performs the restoration process for the target image (S13). On the other hand, in a case in which it is determined that the conditions (see the first to ninth processing conditions) for performing the restoration process based on the optical transfer function are not satisfied (NO in S12), the restoration processing unit 41 skips the restoration process (see S13).

In the example illustrated in FIG. 42, the target image and the imaging device conditions are acquires in the same step. However, the target image and the imaging device conditions may be acquired at different times. For example, only the imaging device conditions may be acquired in Step S11 and the restoration processing unit 41 may acquire the target image between Step S12 and Step S13.

Figure 43:
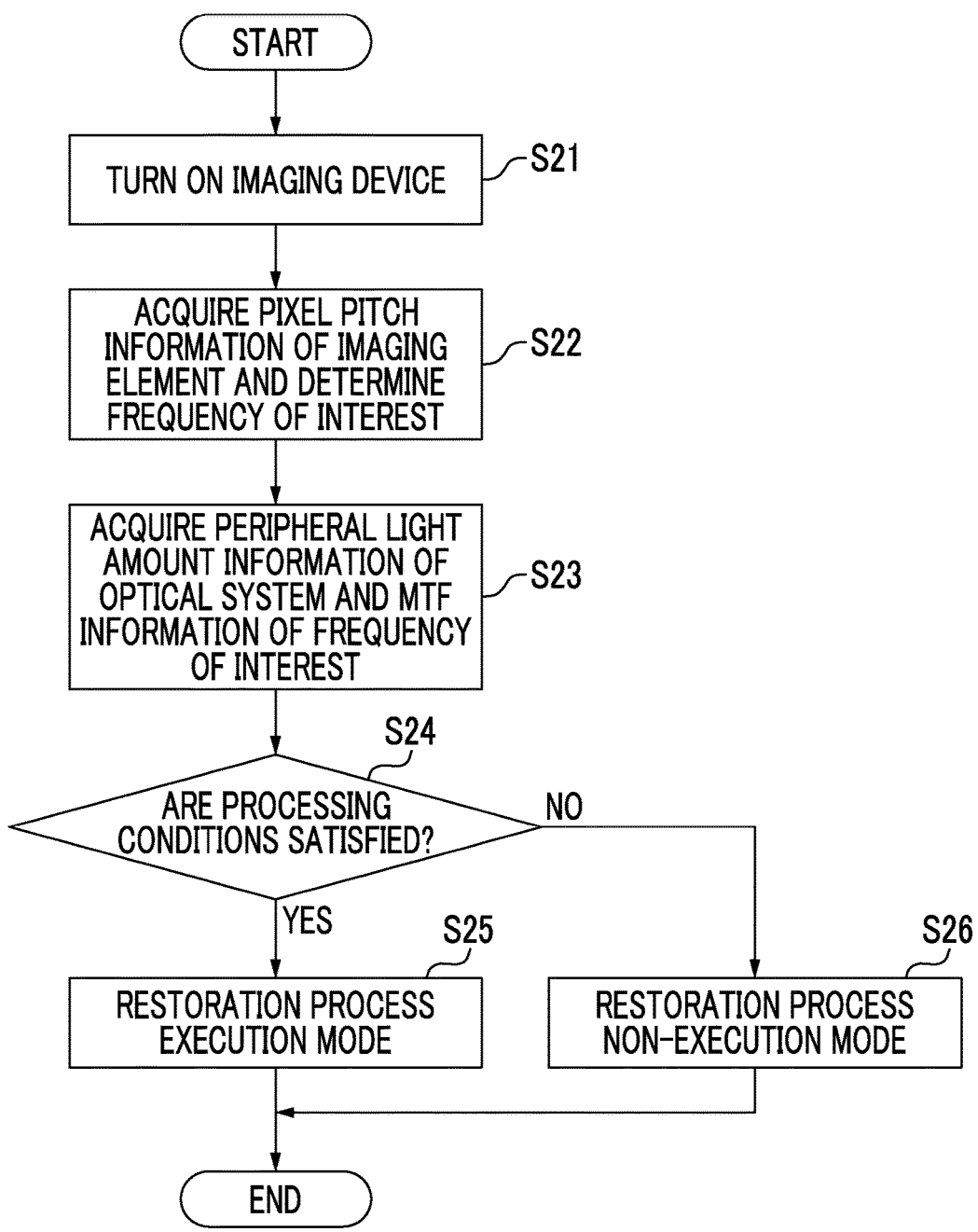
FIG. 43 is a flowchart illustrating an example of the flow of a condition determination process of the imaging device (for example, see the "digital camera" illustrated in FIG. 10) in which an optical system is interchangeable.

FIG. 43 is a flowchart illustrating an example of a condition determination process of an imaging device (for example, see the "digital camera 50" illustrated in FIG. 10) in which the optical system 16 is interchangeable. In this example, the image processing device 40 determines whether the conditions (see the first to ninth processing conditions) for performing the restoration process are satisfied and determines which to use "a mode in which the restoration process is performed (restoration process execution mode)" or "a mode in which the restoration process is not performed (restoration process non-execution mode)" on the basis of the determination result.

That is, in a case in which the imaging device is turned on (S21 in FIG. 43), the image processing device 40 (for example, the restoration processing unit 41) acquires pixel pitch information that directly or indirectly indicates the pixel pitch of the imaging element 22 and determines a frequency of interest (S22). Here, the frequency of interest corresponds to half of the Nyquist frequency defined by the pixel pitch of the imaging element 22.

Then, the image processing device 40 acquires peripheral light amount information that directly or indirectly indicates the relative illumination of the optical system 16 and MTF information that directly or indirectly indicates the value of the MTF of the optical system 16 acquired at the frequency of interest (S23). For example, in the example illustrated in FIG. 10, in a case in which the peripheral light amount information and/or the MTF information is stored in the optical system control unit 55 and the image processing device 40 is provided in the main body control unit 57, the main body control unit 57 (image processing device 40) acquires the peripheral light amount information and/or the MTF information from the optical system control unit 55 through the main body input/output unit 59 and the optical system input/output unit 56.

Then, the image processing device 40 determines whether the peripheral light amount information and the MTF information satisfy "the conditions (see the first to ninth processing conditions) for performing the restoration process" (S24). In a case in which "the conditions (see the first to ninth processing conditions) for performing the restoration process" are satisfied (YES in S24), the image processing device 40 uses the restoration process execution mode (S25) and the restoration processing unit 41 performs the restoration process for the captured image (target image) output from the imaging element 22. On the other hand, in a case in which "the conditions (see the first to ninth processing conditions) for performing the restoration process" are not satisfied (NO in S24), the image processing device 40 uses the restoration process non-execution mode (S26) and the restoration process is not performed for the captured image (target image) output from the imaging element 22.

The object to which the flow of the condition determination process illustrated in FIG. 43 is applied is not particularly limited. For example, the flow of the condition determination process illustrated in FIG. 43 can be applied to the surveillance camera system 20 illustrated in FIG. 2, in addition to the digital camera 50 illustrated in FIG. 10. For example, the flow of the condition determination process illustrated in FIG. 43 can be applied to a case in which the camera-side control processing unit 23 of the surveillance camera system 20 stores the peripheral light amount information and the MTF information and the image processing device 40 is provided in the terminal-side control processing unit 32. In this case, the image processing device 40 communicates with the camera-side control processing unit 23 through the terminal-side communication unit 33 and the camera-side communication unit 24 to acquire the peripheral light amount information and the MTF information (Steps S21 to 23 in FIG. 43), determines whether the conditions (see the first to ninth processing conditions) for performing the restoration process are satisfied (see Step S24), and determines whether to use "the mode in which the restoration process is performed (restoration process execution mode)" or "the mode in which the restoration process is not performed (restoration process non-execution mode)" on the basis of the determination result (see Steps S25 and S26).

Other Modification Examples

The application of the invention is not limited to the above-described embodiments and the above-described embodiments may be modified in various ways.

For example, as the conditions for performing the restoration process based on the optical transfer function, other conditions may be added to "the first to third processing conditions", "the first processing condition and the fourth processing condition", "the first processing condition, the fifth processing condition, and the sixth processing condition", "the first processing condition, the seventh processing condition, and the eighth processing condition", or "each group of the condition groups and the ninth processing condition". For example, the restoration process based on the optical transfer function may be performed in a case in which the imaging device conditions satisfy the condition that "the entire angle of view of the optical system 16 is greater than 100 degrees", the condition that "the entire angle of view of the optical system 16 is greater than 110 degrees" or the condition that "the entire angle of view of the optical system 16 is greater than 120 degrees".

The light amount evaluation region defined in the second processing condition, the fifth processing condition, and the seventh processing condition is not limited to the region based on "80% or more of half of the length of the diagonal line of the imaging surface of the imaging element 22". For example, in a surveillance camera field, in many cases, a region in which the MTF of the optical system 16 is reduced corresponds to 60% (the position of a vertical end (V end)) or more of half of the length of the diagonal line of the imaging surface. Furthermore, in some cases, it is necessary to improve image resolution at a position that is 60% or more of half of the length of the diagonal line of the imaging surface, depending on the purpose of the imaging device. Preferably, in order to appropriately respond to these cases, the light amount evaluation region of the optical system 16 is a region of the optical system 16 in which the distance from the center of the image formation plane of the optical system 16 in the image formation plane is equal to or greater than 60% of half of the length of the diagonal line of the imaging surface of the imaging element 22 and the resolution and image quality of a peripheral portion of an image are improved.

Each of the above-mentioned functional configurations can be implemented by arbitrary hardware, arbitrary software, or a combination thereof. For example, each functional configuration can be implemented by appropriately combining a central processing unit (CPU), a volatile random access memory (RAM), a non-volatile memory, such as an electrically erasable programmable read-only memory (EEPROM), and/or various operation programs, such as an operating system (OS) or an application program. In addition, the invention can be applied to a program that causes a computer to perform the procedure of various processes related to an image processing method and an imaging method in each unit of the imaging device (image processing device 40), a computer-readable recording medium (non-transitory tangible recording medium) that stores the program, or a computer in which the program can be installed.

The aspect to which the invention can be applied is not limited to the surveillance camera system 20 (camera device 10) illustrated in FIGS. 1 and 2, the digital camera 50 illustrated in FIGS. 9 and 10, and the computer 60 illustrated in FIG. 11.

For example, the invention can also be applied to mobile devices having functions (a call function, a communication function, or other computer functions) other than the imaging function as well as the imaging function, in addition to cameras having the imaging function as a main function. For example, mobile phones, smart phones, personal digital assistants (PDA), and portable game machines having a camera function can be given as another aspect to which the invention can be applied. Next, an example of the smart phone to which the invention can be applied will be described.

<Configuration of Smart Phone>

Figure 44:
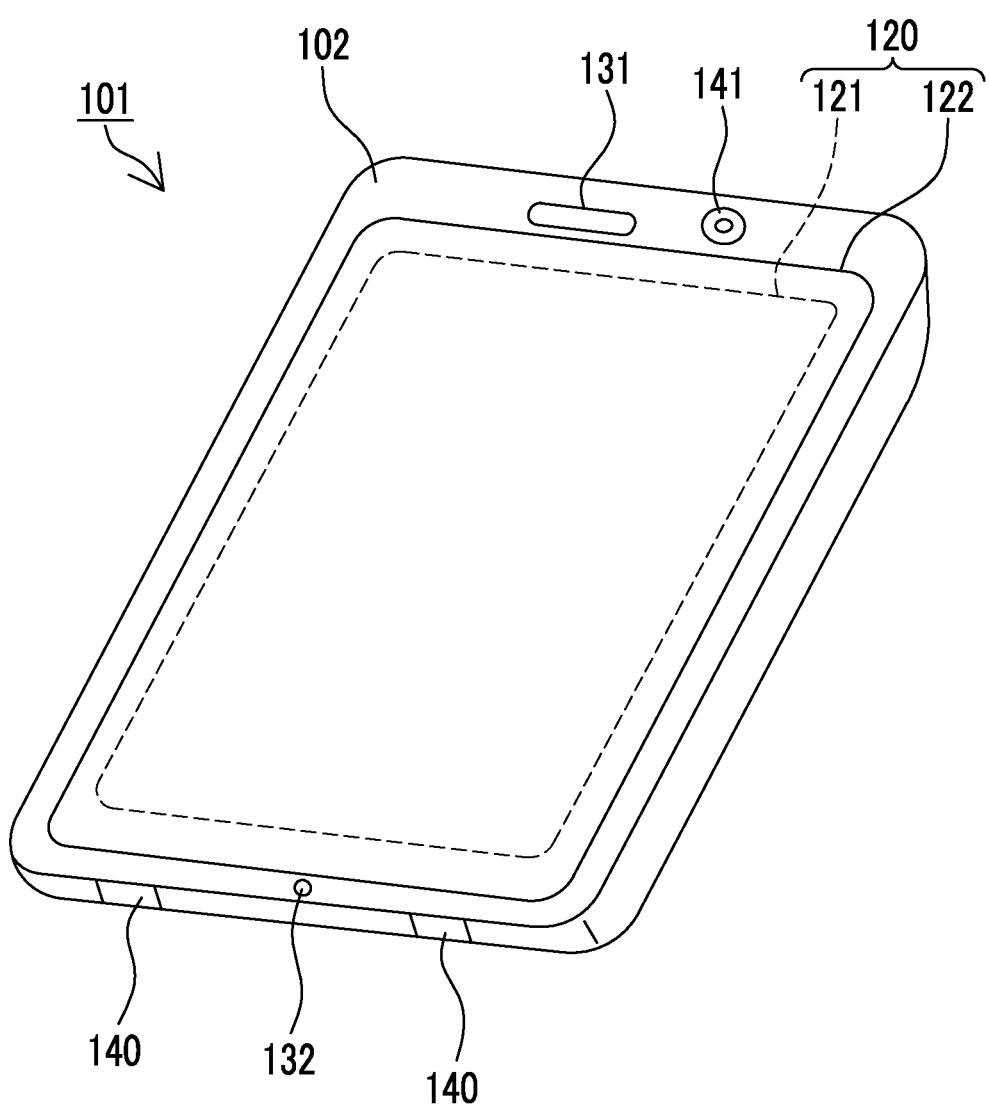
FIG. 44 is a diagram illustrating the outward appearance of a smart phone which is an embodiment of the imaging device according to the invention.

FIG. 44 illustrates the outward appearance of a smart phone 101 which is an embodiment of the imaging device according to the invention. The smart phone 101 illustrated in FIG. 44 includes a housing 102 with a flat panel shape. The smart phone 101 includes a display input unit 120 having a display panel 121 as a display unit and an operation panel 122 as an input unit which are integrally formed on one surface of the housing 102. The housing 102 includes a speaker 131, a microphone 132, an operation unit 140, and a camera unit 141. However, the configuration of the housing 102 is not limited thereto. For example, the display unit and the input unit may be independently provided or the housing 102 may have a folding structure or a sliding structure.

Figure 45:
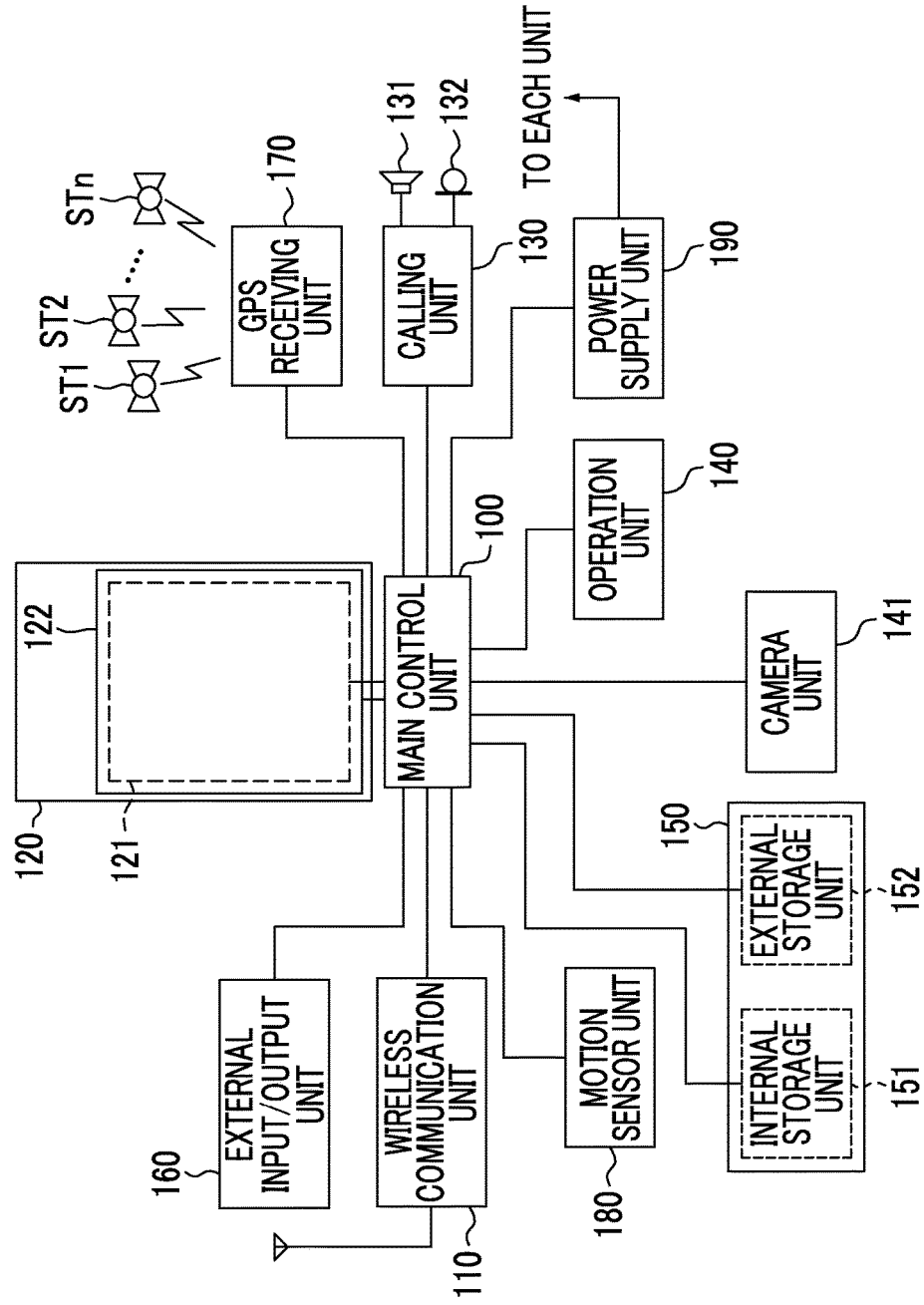
FIG. 45 is a block diagram illustrating the configuration of the smart phone illustrated in FIG. 44.

FIG. 45 is a block diagram illustrating the structure of the smart phone 101 illustrated in FIG. 44. As illustrated in FIG. 45, the smart phone 101 includes, as main components, a wireless communication unit 110, the display input unit 120, a calling unit 130, the operation unit 140, the camera unit 141, a storage unit 150, an external input/output unit 160, a global positioning system (GPS) receiving unit 170, a motion sensor unit 180, a power supply unit 190, and a main control unit 100. In addition, the smart phone 101 has, as a main function, a wireless communication function which performs mobile wireless communication through a base station apparatus and a mobile communication network.

The wireless communication unit 110 performs wireless communication with the base station apparatus which is accommodated in the mobile communication network in response to a command from the main control unit 100. The wireless communication is used to transmit and receive various types of file data, such as voice data and image data, and electronic mail data or to receive, for example, web data or streaming data.

The display input unit 120 is a so-called touch panel including the display panel 121 and the operation panel 122. The display input unit 120 displays, for example, images (still images and motion pictures) or text information to visually transmit information to the user and detects the user's operation for the displayed information under the control of the main control unit 100.

The display panel 121 uses, for example, a liquid crystal display (LCD) or an organic electro-luminescence display (OELD) as a display device. The operation panel 122 is a device that is provided such that an image displayed on a display surface of the display panel 121 can be visually recognized and detects one or a plurality of coordinate points operated by a finger of the user or a stylus. In a case in which the device is operated by a finger of the user or a stylus, the operation panel 122 outputs a detection signal which is generated by the operation to the main control unit 100. Then, the main control unit 100 detects an operation position (coordinates) on the display panel 121 on the basis of the received detection signal.

As illustrated in FIG. 44, the display panel 121 and the operation panel 122 of the smart phone 101 which is an embodiment of the imaging device according to the invention are integrated to form the display input unit 120 and the operation panel 122 is provided so as to completely cover the display panel 121. In a case in which this arrangement is used, the operation panel 122 may have a function of detecting the user's operation even in a region other than the display panel 121. In other words, the operation panel 122 may include a detection region (hereinafter, referred to as a "display region") for an overlap portion which overlaps the display panel 121 and a detection region (hereinafter, referred to as a "non-display region") for an outer edge portion which does not overlap the display panel 121.

The size of the display region may be exactly equal to the size of the display panel 121. However, the sizes are not necessarily equal to each other. The operation panel 122 may include two sensitive regions, that is, an outer edge portion and an inner portion other than the outer edge portion. The width of the outer edge portion is appropriately designed according to, for example, the size of the housing 102. Examples of a position detection method which is used in the operation panel 122 include a matrix switching method, a resistive film method, a surface elastic wave method, an infrared method, an electromagnetic induction method, and a capacitive sensing method. Any of the methods may be used.

The calling unit 130 includes the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 44, for example, the speaker 131 can be mounted on the same surface as the display input unit 120 and the microphone 132 can be mounted on the side surface of the housing 102.

The operation unit 140 is a hardware key which uses, for example, a key switch and receives commands from the user. For example, as illustrated in FIG. 44, the operation unit 140 is a push button switch which is mounted on the side surface of the housing 102 of the smart phone 101, is turned on in a case in which it is pressed by, for example, a finger, and is turned off by the restoring force of a spring in a case in which the finger is taken off.

The storage unit 150 stores a control program or control data of the main control unit 100, application software, address data which is associated with, for example, the names or phone numbers of communication partners, transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152, which has a slot for a detachable external memory. Each of the internal storage unit 151 and the external storage unit 152 forming the storage unit 150 may be implemented by a storage medium, such as a flash memory, a hard disk, a multimedia-cardmicro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) or IEEE1394 defined by The Institute of Electrical and Electronics Engineers, Inc. (IEEE)) or a network (for example, the Internet, a wireless LAN, a Bluetooth (registered trademark) network, a radio frequency identification (RFID) network, an Infrared Data Association (IrDA) (registered trademark) network, an Ultra Wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone is connected wirelessly or in a wired manner. The external input/output unit 160 may transmit data received from the external apparatus to each component of the smart phone 101 or may transmit data in the smart phone 101 to the external apparatus.

The GPS receiving unit 170 receives GPS signals transmitted from GPS satellites ST1, ST2, STn and performs a position measurement process on the basis of a plurality of received GPS signals to detect a position including the latitude, longitude, and height of the smart phone 101, in response to a command from the main control unit 100. In a case in which the GPS receiving unit 170 can acquire positional information from the wireless communication unit 110 and/or the external input/output unit 160 (for example, a wireless local area network (LAN)), it can detect the position using the positional information.

The motion sensor unit 180 includes, for example, a triaxial acceleration sensor and detects the physical movement of the smart phone 101 in response to a command from the main control unit 100. The physical movement of the smart phone 101 is detected to detect the moving direction or acceleration of the smart phone 101. The detection result is output to the main control unit 100.

The power supply unit 190 supplies power accumulated in a battery (not illustrated) to each unit of the smart phone 101 in response to a command from the main control unit 100.

The main control unit 100 includes a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays a video on the display input unit 120 on the basis of image data (still image data or motion picture data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operation unit 140 and the operation panel 122.

The main control unit 100 performs the display control to display a software key, such as an icon for starting application software or a scroll bar, or to display a window for creating electronic mail. The scroll bar means a software key for receiving a command to move a displayed portion of an image that is too large to fit into the display region of the display panel 121.

The main control unit 100 performs the operation detection control to detect the operation of the user input through the operation unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera that electronically captures images using the imaging element 22 such as a CMOS sensor. In addition, the camera unit 141 can convert captured image data into image data compressed in, for example, a JPEG format, record the image data in the storage unit 150, or output the image data through the external input/output unit 160 or the wireless communication unit 110, under the control of the main control unit 100. In the smart phone 101 illustrated in FIG. 44, the camera unit 141 is mounted on the same surface as the display input unit 120. However, the mounting position of the camera unit 141 is not limited thereto. For example, the camera unit 141 is not mounted on the front surface of the housing 102 on which the display input unit 120 is provided, but may be mounted on the rear surface of the housing 102. Alternatively, a plurality of camera units 141 may be mounted on the housing 102. In a case in which the plurality of camera units 141 are mounted, the camera units 141 used for imaging may be switched such that the independent camera unit 141 captures images or the plurality of camera units 141 may be used at the same time to capture images.

The camera unit 141 can be used for various functions of the smart phone 101. For example, the image acquired by the camera unit 141 may be displayed on the display panel 121 or the image acquired by the camera unit 141 may be used as one of the operation input methods of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

In addition, for example, the positional information acquired by the GPS receiving unit 170, the voice information acquired by the microphone 132 (for example, the voice information may be converted into text information by the main control unit), and the posture information acquired by the motion sensor unit 180 may be added to still image data or motion picture data and the image data may be recorded in the storage unit 150 or may be output through the external input/output unit 160 or the wireless communication unit 110.

The image processing device 40 (particularly, the restoration processing unit 41) can be implemented by, for example, the main control unit 100.

EXPLANATION OF REFERENCES

10: camera device
12: imaging unit
12A: imaging support unit
14A: support frame
14B: mount
14: support unit
16: optical system
18: control panel
20: surveillance camera system
22: imaging element
23: camera-side control processing unit
24: camera-side communication unit
30: control terminal
31: user interface
32: terminal-side control processing unit
33: terminal-side communication unit
40: image processing device
41: restoration processing unit
42: image acquisition unit
43: condition acquisition unit
50: digital camera
51: imaging control processing unit
52: communication unit
53: imaging user interface
54: main body unit
55: optical system control unit
56: optical system input/output unit
57: main body control unit
58: optical system mounting unit
59: main body input/output unit
60: computer
61: computer control processing unit
62: computer input/output unit
63: computer user interface
100: main control unit
101: smart phone
102: housing
110: wireless communication unit
120: display input unit
121: display panel
122: operation panel
130: calling unit
131: speaker
132: microphone
140: operation unit
141: camera unit
150: storage unit
151: internal storage unit
152: external storage unit
160: external input/output unit
170: GPS receiving unit
180: motion sensor unit
190: power supply unit

What is claimed is:

1. An imaging device comprising:
an optical system;
an imaging sensor that receives imaging light through the optical system and outputs a target image; and
a processor configured to perform a restoration process based on an optical transfer function of the optical system for the target image, wherein:
an entire angle of view of the optical system is greater than 90 degrees;
a light amount evaluation region of the optical system is a region of the optical system in which a distance from a center of an image formation plane of the optical system in the image formation plane is equal to or greater than 80% of half of a length of a diagonal line of an imaging surface of the imaging sensor;
in a case in which a first evaluation wavelength including a wavelength component of 546.1 nm is used, a ratio of the amount of light in the light amount evaluation region to the amount of light in a region of the optical system corresponding to the center of the image formation plane is equal to or greater than 25%; and
in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging sensor is equal to or greater than 15%.

2. An imaging device comprising:
an optical system;
an imaging sensor that receives imaging light through the optical system and outputs a target image; and
a processor configured to perform a restoration process based on an optical transfer function of the optical system for the target image, wherein:
an entire angle of view of the optical system is greater than 90 degrees; and
the optical system satisfies the following expression:

$$\|H(f, h)\| > \frac{1}{2}\left(1 - \sqrt{1 - \frac{4}{SNR(f)R^2(h)}}\right)$$

where f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging sensor and a first evaluation wavelength including a wavelength component of 546.1 nm is used and satisfies 0≤R(h)≤1, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

3. An image processing device comprising a processor configured to:

acquire a target image;

acquire imaging device conditions indicating information of an optical system and an imaging sensor when the target image is captured; and perform a restoration process based on an optical transfer function of the optical system for the target image in a case in which the imaging device conditions satisfy the following:

an entire angle of view of the optical system is greater than 90 degrees;

in a case in which a light amount evaluation region of the optical system is a region of the optical system in which a distance from a center of an image formation plane of the optical system in the image formation plane is equal to or greater than 80% of half of a length of a diagonal line of an imaging surface of the imaging sensor and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging sensor is equal to or greater than 15%.

4. The image processing device according to claim 3, wherein the value of the MTF is the smaller of the value of the MTF of the optical system in a sagittal direction and the value of the MTF in a tangential direction.

5. The image processing device according to claim 3, wherein the processor is further configured to perform the restoration process in a case in which the imaging device conditions further satisfy the following:

in a case in which the first evaluation wavelength is used, the ratio of the amount of light in the light amount evaluation region to the amount of light in the region of the optical system corresponding to the center of the image formation plane is equal to or greater than 30%; and in a case in which the second evaluation wavelength is used, the value of the MTF acquired at half of the Nyquist frequency of the imaging sensor is equal to or greater than 20%.

6. The image processing device according to claim 3, wherein the processor is further configured to perform the restoration process in a case in which the imaging device conditions further satisfy the following:

in a case in which the first evaluation wavelength is used, the ratio of the amount of light in the light amount evaluation region to the amount of light in the region of the optical system corresponding to the center of the image formation plane is equal to or greater than 35%; and in a case in which the second evaluation wavelength is used, the value of the MTF acquired at half of the Nyquist frequency of the imaging sensor is equal to or greater than 25%.

7. The image processing device according to claim 3, wherein the processor is further configured to perform the restoration process in a case in which the imaging device conditions further satisfy the following:

$$A\% \geq 0.75 \times B\% - 40\%$$

where A % indicates the value of the MTF of the optical system acquired at half of the Nyquist frequency of the imaging sensor in a case in which the second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, and B % indicates the ratio of the amount of light in the light amount evaluation region to the amount of light in the region of the optical system corresponding to the center of the image formation plane in a case in which the first evaluation wavelength including a wavelength component of 546.1 nm is used.

8. The image processing device according to claim 3, wherein the light amount evaluation region is a region of the optical system in which the distance from the center of the image formation plane in the image formation plane is equal to or greater than 60% of half of the length of the diagonal line of the imaging surface of the imaging sensor.

9. An image processing device comprising:

a processor configured to:

acquire a target image;

acquire imaging device conditions indicating information of an optical system and an imaging sensor when the target image is captured; and perform a restoration process based on an optical transfer function of the optical system for the target image in a case in which the imaging device conditions satisfy the following:

an entire angle of view of the optical system is greater than 90 degrees; and $$\|H(f,h)\| > \frac{1}{2}\left(1 - \sqrt{1 - \frac{4}{SNR(f)R^2(h)}}\right)$$

where f indicates a spatial frequency of the target image, h indicates a distance from a center of the target image, H(f, h) indicates an OTF of the optical system, R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging sensor and a first evaluation wavelength including a wavelength component of 546.1 nm is used and satisfies $0 \leq R(h) \leq 1$, SNR(f) is represented by SNR(f)=S(f)/N(f), S(f) indicates a mean square value of the amount of signal at the center of the target image expected in an assumed imaging condition, and N(f) indicates a mean square value of the amount of noise expected in an assumed imaging condition.

10. The image processing device according to claim 9, wherein the processor is further configured to perform the restoration process in a case in which the imaging device conditions further satisfy the following:

$$A\% \geq 0.75 \times B\% - 40\%$$

where A % indicates the value of the MTF of the optical system acquired at half of the Nyquist frequency of the imaging sensor in a case in which the second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, and B % indicates the ratio of the amount of light in the light amount evaluation region to the amount of light in the region of the optical system corresponding to the center of the image formation plane in a case in which the first evaluation wavelength including a wavelength component of 546.1 nm is used.

11. The image processing device according to claim 9, wherein the light amount evaluation region is a region of the optical system in which the distance from the center of the image formation plane in the image formation plane is equal to or greater than 60% of half of the length of the diagonal line of the imaging surface of the imaging sensor.

12. An imaging device comprising:
an optical system mount to which an optical system is detachably attached;
an imaging sensor that receives imaging light through the optical system mounted on the optical system mount and outputs an image; and
the image processing device according to claim 3, wherein the image output from the imaging sensor is the target image.

13. An imaging device comprising:
an optical system mount to which an optical system is detachably attached;
an imaging sensor that receives imaging light through the optical system mounted on the optical system mount and outputs an image; and
the image processing device according to claim 9, wherein the image output from the imaging sensor is the target image.

14. An imaging device comprising:
a camera device including an optical system, an imaging sensor that receives imaging light through the optical system and outputs an image, a camera-side control processor that is connected to the imaging sensor, and a camera-side communication circuitry that is connected to the camera-side control processor; and
a control terminal including a terminal-side communication circuitry that can communicate with the camera-side communication circuitry, a terminal-side control processor that is connected to the terminal-side communication circuitry, and a user interface that is connected to the terminal-side control processor, wherein:
at least one of the camera-side control processor or the terminal-side control processor includes the image processing device according to claim 3; and
the image output from the imaging sensor is the target image.

15. An imaging device comprising:
a camera device including an optical system, an imaging sensor that receives imaging light through the optical system and outputs an image, a camera-side control processor that is connected to the imaging sensor, and a camera-side communication circuitry that is connected to the camera-side control processor; and
a control terminal including a terminal-side communication circuitry that can communicate with the camera-side communication circuitry, a terminal-side control processor that is connected to the terminal-side communication circuitry, and a user interface that is connected to the terminal-side control processor, wherein:
at least one of the camera-side control processor or the terminal-side control processor includes the image processing device according to claim 9; and
the image output from the imaging sensor is the target image.

16. An image processing method comprising:
a step of acquiring a target image;
a step of acquiring imaging device conditions indicating information of an optical system and an imaging sensor when the target image is captured; and
a step of performing a restoration process based on an optical transfer function of the optical system for the target image in a case in which the imaging device conditions satisfy the following:
an entire angle of view of the optical system is greater than 90 degrees;
in a case in which a light amount evaluation region of the optical system is a region of the optical system in which a distance from a center of an image formation plane of the optical system in the image formation plane is equal to or greater than 80% of half of a length of a diagonal line of an imaging surface of the imaging sensor and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and
in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging sensor is equal to or greater than 15%.

17. An image processing method comprising:
a step of acquiring a target image;
a step of acquiring imaging device conditions indicating information of an optical system and an imaging sensor when the target image is captured; and
a step of performing a restoration process based on an optical transfer function of the optical system for the target image in a case in which the imaging device conditions satisfy the following:
an entire angle of view of the optical system is greater than 90 degrees; and $$\|H(f, h)\| > \frac{1}{2}\left(1 - \sqrt{1 - \frac{4}{SNR(f)R^2(h)}}\right)$$

where f indicates a spatial frequency of the target image,
h indicates a distance from a center of the target image,
H(f, h) indicates an OTF of the optical system,
R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging sensor and a first evaluation wavelength including a wavelength component of 546.1 nm is used and satisfies 0≤R(h)≤1,
SNR(f) is represented by SNR(f)=S(f)/N(f),
S(f) indicates a mean square value of the amount of signal at the center of the target image expected in an assumed imaging condition, and
N(f) indicates a mean square value of the amount of noise expected in an assumed imaging condition.

18. A non-transitory computer-readable tangible recording medium that stores a program causing a computer to perform:
a step of acquiring a target image;
a step of acquiring imaging device conditions indicating information of an optical system and an imaging sensor when the target image is captured; and
a step of performing a restoration process based on an optical transfer function of the optical system for the target image in a case in which the imaging device conditions satisfy the following:
an entire angle of view of the optical system is greater than 90 degrees;
in a case in which a light amount evaluation region of the optical system is a region of the optical system in which a distance from a center of an image formation plane of the optical system in the image formation plane is equal to or greater than 80% of half of a length of a diagonal line of an imaging surface of the imaging sensor and a first evaluation wavelength including a wavelength component of 546.1 nm is used, a ratio of the amount of light in the light amount evaluation region to the amount of light in a region of the optical system corresponding to the center of the image formation plane is equal to or greater than 25%; and
in a case in which a second evaluation wavelength including a wavelength component of 406.0 nm, a wavelength component of 430.5 nm, a wavelength component of 471.2 nm, a wavelength component of 522.5 nm, a wavelength component of 577.5 nm, a wavelength component of 628.8 nm, a wavelength component of 669.5 nm, and a wavelength component of 694.0 nm is used, a value of an MTF of the optical system acquired at half of a Nyquist frequency of the imaging sensor is equal to or greater than 15%.

19. A non-transitory computer-readable tangible recording medium that stores a program causing a computer to perform:
a step of acquiring a target image;
a step of acquiring imaging device conditions indicating information of an optical system and an imaging sensor when the target image is captured; and
a step of performing a restoration process based on an optical transfer function of the optical system for the target image in a case in which the imaging device conditions satisfy the following:
an entire angle of view of the optical system is greater than 90 degrees; and $$\|H(f, h)\| > \frac{1}{2}\left(1 - \sqrt{1 - \frac{4}{SNR(f)R^2(h)}}\right)$$

where f indicates a spatial frequency of the target image,
h indicates a distance from a center of the target image,
H(f, h) indicates an OTF of the optical system,
R(h) indicates a ratio of the amount of light in a light amount evaluation region of the optical system to the amount of light in a region of the optical system corresponding to a center of an image formation plane of the optical system in a case in which the light amount evaluation region is a region of the optical system in which a distance from the center of the image formation plane in the image formation plane is equal to or greater than 80% of half of a length of a diagonal line of an imaging surface of the imaging sensor and a first evaluation wavelength including a wavelength component of 546.1 nm is used and satisfies 0≤R(h)≤1,
SNR(f) is represented by SNR(f)=S(f)/N(f),
S(f) indicates a mean square value of the amount of signal at the center of the target image expected in an assumed imaging condition, and
N(f) indicates a mean square value of the amount of noise expected in an assumed imaging condition.

* * * * *